США010202089B2

United States Patent
Ujiie et al.

(10) Patent No.: US 10,202,089 B2
(45) Date of Patent: Feb. 12, 2019

(54) IN-VEHICLE NETWORK SYSTEM, ELECTRONIC CONTROL UNIT, AND UPDATE PROCESSING METHOD

(71) Applicant: Panasonic Intellectual Property Corporation of America, Torrance, CA (US)

(72) Inventors: Yoshihiro Ujiie, Osaka (JP); Hideki Matsushima, Osaka (JP); Tomoyuki Haga, Nara (JP); Manabu Maeda, Osaka (JP); Yuji Unagami, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 273 days.

(21) Appl. No.: 15/163,234

(22) Filed: May 24, 2016

(65) Prior Publication Data

US 2016/0264071 A1 Sep. 15, 2016

Related U.S. Application Data

(63) Continuation of application No. PCT/JP2015/002162, filed on Apr. 21, 2015.

(30) Foreign Application Priority Data

Feb. 20, 2015 (JP) .................................. 2015-032210

(51) Int. Cl.
*B60R 16/023* (2006.01)
*H04L 29/08* (2006.01)
(Continued)

(52) U.S. Cl.
CPC .......... *B60R 16/023* (2013.01); *H04L 9/0891* (2013.01); *H04L 9/3242* (2013.01);
(Continued)

(58) Field of Classification Search
CPC ... B60R 16/023; B60R 16/0231; B60R 25/20; H04L 9/0891; H04L 9/3242; H04L 12/40;
(Continued)

(56) References Cited

U.S. PATENT DOCUMENTS 6,665,601 B1 * 12/2003 Nielsen .................. H04L 12/40
701/50
9,127,610 B2 * 9/2015 Smith ...................... F02D 41/22
(Continued)

FOREIGN PATENT DOCUMENTS

| EP | 2858003 A1 | 4/2015 |
| JP | 2005-203882 | 7/2005 |

(Continued)

OTHER PUBLICATIONS

International Search Report of PCT application No. PCT/JP2015/002162 dated Jul. 21, 2015.
(Continued)

*Primary Examiner* — Jason K Gee
*Assistant Examiner* — Shu C Gao
(74) *Attorney, Agent, or Firm* — Greenblum & Bernstein, P.L.C.

(57) ABSTRACT

A method for use in an in-vehicle network system is provided. The in-vehicle network system includes a plurality of electronic control units that communicate a data frame having a message authentication code (MAC) added thereto with one another via a bus in accordance with the Controller Area Network (CAN) protocol. The method includes detecting the state of a vehicle having the in-vehicle network system mounted therein and updating a MAC key used to
(Continued)

generate the MAC under the condition that the detected state of the vehicle is a predetermined state.

10 Claims, 18 Drawing Sheets

Related U.S. Application Data

(60) Provisional application No. 61/990,150, filed on May 8, 2014.

(51) Int. Cl.
*H04L 29/06* (2006.01)
*H04L 12/40* (2006.01)
*H04L 9/08* (2006.01)
*H04L 9/32* (2006.01)
*H04W 4/46* (2018.01)

(52) U.S. Cl.
CPC ............ *H04L 12/40* (2013.01); *H04L 63/062* (2013.01); *H04L 63/067* (2013.01); *H04L 63/0869* (2013.01); *H04L 63/123* (2013.01); *H04L 63/126* (2013.01); *H04L 67/12* (2013.01); *H04L 2012/40215* (2013.01); *H04L 2012/40273* (2013.01); *H04L 2209/84* (2013.01); *H04W 4/46* (2018.02)

(58) Field of Classification Search
CPC ..... H04L 63/062; H04L 63/0869; H04L 9/32; H04L 16/023; H04L 2209/84; H04L 67/12; H04L 9/3226; H04L 63/126; H04L 63/068; H04L 63/08; H04L 9/08; H04L 63/0428; H04L 12/40163; H04L 12/4135; H04L 12/4035; H04L 2012/40215; H04L 2012/40273; G06F 21/44; G06F 2221/2129; G07C 5/085; F02D 41/22; F02D 41/28; F02D 2041/227; F02D 2200/0602; F02D 2041/285; Y02T 10/40
See application file for complete search history.

(56) References Cited

U.S. PATENT DOCUMENTS

| | | | | |
|---|---|---|---|---|
| 9,132,790 B2 * | 9/2015 | Miyake | ............... | H04L 9/32 |
| 9,231,936 B1 * | 1/2016 | Wang | ............... | H04L 63/08 |
| 9,577,997 B2 * | 2/2017 | Mabuchi | ............... | H04L 67/12 |
| 2005/0021200 A1 * | 1/2005 | Taki | ............... | G07C 5/008 |
| | | | | 701/32.7 |
| 2006/0247832 A1 * | 11/2006 | Taki | ............... | G06Q 10/02 |
| | | | | 701/31.4 |
| 2012/0071151 A1 * | 3/2012 | Abramson | ............... | H04L 67/12 |
| | | | | 455/418 |
| 2012/0109447 A1 * | 5/2012 | Yousefi | ............... | H04N 7/183 |
| | | | | 701/32.2 |
| 2012/0215491 A1 * | 8/2012 | Theriot | ............... | G07C 5/0808 |
| | | | | 702/183 |
| 2013/0145065 A1 * | 6/2013 | Ricci | ............... | H04W 4/90 |
| | | | | 710/241 |
| 2013/0151111 A1 * | 6/2013 | Skelton | ............... | B60R 25/00 |
| | | | | 701/99 |
| 2014/0310530 A1 * | 10/2014 | Oguma | ............... | H04L 9/3242 |
| | | | | 713/181 |

FOREIGN PATENT DOCUMENTS

| | | |
|---|---|---|
| JP | 2013-098719 | 5/2013 |
| WO | 2013/128317 A1 | 9/2013 |

OTHER PUBLICATIONS

CAN Specification 2.0 1991 [online] CAN in Automation (CIA) [searched on Nov. 14, 2014], Internet<URL:http//www.can-cia.org/fileadmin/cia/specifications/CAN20A.pdf>.

H.Krawczyk et al., "HMAC: Keyed-Hashing for Message Authentication" Network Working Group, RFC2104, Feb. 1997.

The Extended European Search Report dated Apr. 20, 2017 for the related European Patent Application No. 15789442.9.

* cited by examiner

FIG. 4

| RECEIVED ID LIST |
|---|
| 1 |
| 2 |
| 3 |
| 4 |

FIG. 5

| VEHICLE STATE | DETERMINATION RULE |
|---|---|
| TRAVELING | PERFORM NEITHER KEY UPDATING NOR COUNTER RESETTING |
| STOPPING | PERFORM NEITHER KEY UPDATING NOR COUNTER RESETTING |
| PARKING | PERFORM BOTH KEY UPDATING AND COUNTER RESETTING |

FIG. 6

| ID | DATA |
|---|---|
| 1 | 0 1 0x1a c4 f7 d3 |
| 1 | 1 2 0xf9 3b 65 9e |
| 1 | 2 3 0x34 5c ef 79 |
| 1 | 3 4 0x90 2a e3 dd |
| 1 | 4 5 0x31 2c d5 ee |
| ... | ... |

FIG. 7

| ID | DATA |
|---|---|
| 2 | 100 1 0x34 5d ef 78 |
| 2 | 90 2 0x34 2d d5 ea |
| 2 | 80 3 0x90 8a e8 6b |
| 2 | 70 4 0x4a d4 f7 d8 |
| 2 | 60 5 0xf1 32 7e 6a |
| ... | ... |

FIG. 8

| ID | DATA |
|---|---|
| 3 | 1 1 0x92 d5 e8 3b |
| 3 | 1 2 0x81 a2 c5 ca |
| 3 | 0 3 0xf8 4d 66 9a |
| 3 | 0 4 0x95 a2 3e ac |
| 3 | 0 5 0x1b c5 f6 d1 |
| ... | ... |

FIG. 9

| ID | DATA |
|---|---|
| 4 | 0 1 0x9d 20 03 d3 |
| 4 | 10 2 0x3a 2d 5b ef |
| 4 | 20 3 0x4c c8 3b b5 |
| 4 | 30 4 0x5f f1 d2 da |
| 4 | 40 5 0xb1 0b 70 a4 |
| ... | ... |

FIG. 16

| AREA TYPE | VEHICLE STATE | DETERMINATION RULE |
|---|---|---|
| DRIVE-TRAIN | TRAVELING | PERFORM NEITHER KEY UPDATING NOR COUNTER RESETTING |
| | STOPPING | PERFORM NEITHER KEY UPDATING NOR COUNTER RESETTING |
| | PARKING | PERFORM BOTH KEY UPDATING AND COUNTER RESETTING |
| BODY FAMILY | TRAVELING | PERFORM NEITHER KEY UPDATING NOR COUNTER RESETTING |
| | STOPPING | PERFORM BOTH KEY UPDATING AND COUNTER RESETTING |
| | PARKING | PERFORM BOTH KEY UPDATING AND COUNTER RESETTING |

| TRANSFER SOURCE | TRANSFER DESTINATION | ID |
|---|---|---|
| 2200a | 2200b | * |
| 2200b | 2200a | 3 |

IN-VEHICLE NETWORK SYSTEM, ELECTRONIC CONTROL UNIT, AND UPDATE PROCESSING METHOD

BACKGROUND

1. Technical Field

The present disclosure relates to a technology for working against transmission of a fraudulent frame in an in-vehicle network in which electronic control units communicate with one another.

2. Description of the Related Art

In recent years, a plurality of devices called Electronic Control Units (ECUs) have been disposed in a system in motor vehicles. A network that connects the ECUs with one another is called an in-vehicle network. A plurality of standards are provided for in-vehicle networks. One of the mainstream standards is CAN (Controller Area Network) defined by ISO11898-1 (refer to "CAN Specification 2.0 Part A", [online], CAN in Automation (CiA), [searched on Nov. 14, 2014], the Internet (URL: http://www.can-cia.org/fileadmin/cia/specifications/CAN20A.pdf)).

In CAN, the communication channel is formed from 2 buses. An ECU connected to the buses is referred to as a "node". Each of the nodes connected to the buses sends and receives a message called a frame. A sender node that sends a frame applies voltages on the 2 buses so as to generate a potential difference between the buses. Thus, the sender node sends a value of "1" called "recessive" and a value of "0" called "dominant". If a plurality of sender nodes send recessive and dominant at exactly the same time, dominant has higher priority and is sent. If the format of a received frame is abnormal, the receiver node sends a frame called an error frame. An error frame is formed from 6 consecutively sent dominant bits. By sending the error frame, the sender node or the other receiver nodes are notified of the abnormity of a frame.

In addition, in CAN, identifiers indicating the destination address and the source address are not present. The sender node attaches an ID called a message ID to each of frames and sends the frame (i.e., delivers a signal to the buses). Each of the receiver nodes receives only a predetermined ID (i.e., reads the signal from the buses). Furthermore, CAN employs the CSMA/CA (Carrier Sense Multiple Access/Collision Avoidance) technique. When a plurality of nodes simultaneously send frames, arbitration using the message IDs is performed, and a frame having a smaller message ID is sent first.

When, in an in-vehicle network, a fraudulent node is connected to the buses and if the fraudulent node unauthorizedly sends a data frame, the vehicle body may be unauthorizedly controlled. To prevent control based on transmission of such a fraudulent frame, a technology for, in general, providing Message Authentication Code (MAC) in a data field defined by CAN and sending the frame has been developed (refer to Japanese Unexamined Patent Application Publication No. 2013-98719).

SUMMARY

However, since the data length of the MAC that can be stored in the data field defined by CAN is not sufficiently long, there may be a risk of, for example, a brute force attack from a fraudulent node connected to the buses against the MAC.

One non-limiting and exemplary embodiment provides an in-vehicle network system for increasing security against a brute force attack from a fraudulent node connected to the bus on the MAC. In addition, the present disclosure provides an electronic control unit (ECU) used in the in-vehicle network and an update processing method for performing an update process related to updating data used to generate MAC for increasing the security against a brute force attack from a fraudulent node (e.g., a MAC key).

In one general aspect, the techniques disclosed here feature an update processing method for updating a MAC key used to generate a message authentication code (MAC) in an in-vehicle network system including a plurality of electronic control units that each communicate a data frame with a MAC with one another via at least one bus in accordance with CAN (Controller Area Network) protocol. The method includes detecting a state of a vehicle having the in-vehicle network system mounted therein and updating a MAC key used to generate the message authentication code under the condition that the detected state of the vehicle is a predetermined state.

According to the present disclosure, the security against an attack from a fraudulent node connected to a bus in a network communication system that communicates information on the basis of the CAN protocol can be increased.

It should be noted that general or specific embodiments may be implemented as a system, an apparatus, an integrated circuit, a computer program, a storage medium, such as a computer-readable CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates an example of a received ID list;

FIG. 5 illustrates an example of a determination rule;

FIG. 6 illustrates an example of an ID and a data field of a data frame sent from an ECU connected to an engine;

FIG. 7 illustrates an example of an ID and a data field of a data frame sent from an ECU connected to a brake;

FIG. 8 illustrates an example of an ID and a data field of a data frame sent from an ECU connected to a door open/close sensor;

FIG. 9 illustrates an example of an ID and a data field of a data frame sent from an ECU connected to a window open/close sensor;

FIG. 16 illustrates an example of a determination rule;

DETAILED DESCRIPTION

Figure 1:
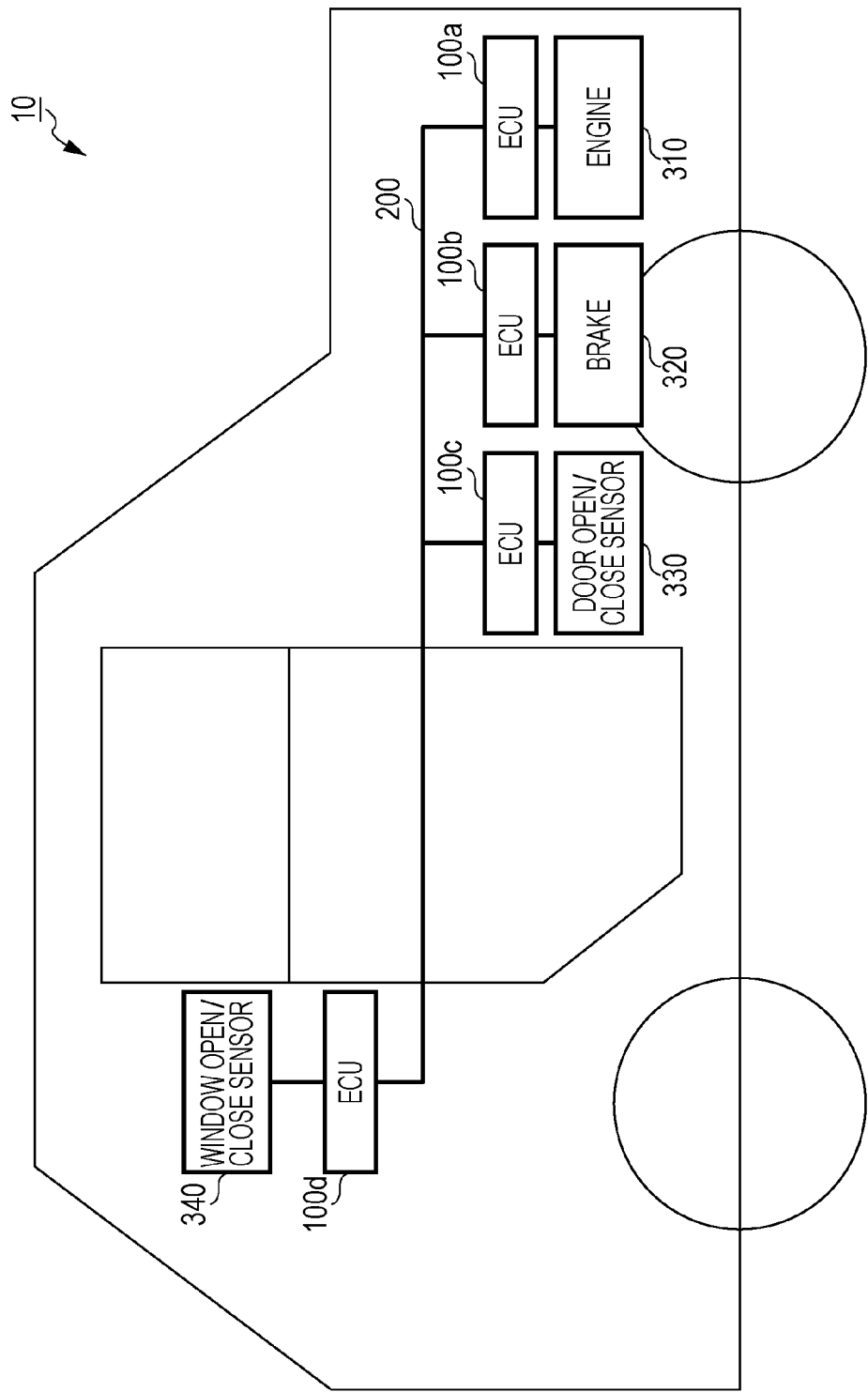
FIG. 1 illustrates the overall configuration of an in-vehicle network system according to a first embodiment.

According to an aspect of the present disclosure, an update processing method for updating a MAC key used to generate a message authentication code (MAC) in an in-vehicle network system including a plurality of electronic control units that each communicate a data frame having a MAC added thereto with one another via at least one bus in accordance with CAN (Controller Area Network) protocol is provided. The method includes detecting a state of a vehicle having the in-vehicle network system mounted therein and updating a MAC key used to generate the message authentication code under the condition that the detected state of the vehicle is a predetermined state. There is some correlation between the vehicle state and the processing load on the ECU or the amount of traffic of the bus. Accordingly, by performing the update process when the vehicle state is a state appropriate for updating, for example, the MAC key, update that is synchronized among the ECUs is available. Since the MAC key used to generate MAC can be appropriately updated, the security against a brute force attack on MAC from the fraudulent node can be increased.

In addition, the plurality of electronic control units may include a first electronic control unit and a second electronic control unit. The method may further include the first electronic control unit sending a data frame identified with a predetermined message ID, the first electronic control unit generating a first message authentication code that reflects the value of a transmission counter which counts the number of transmission events using the MAC key, the first electronic control unit adding the first message authentication code to the data frame to be sent, the second electronic control unit receiving the data frame identified by the predetermined message ID, the first electronic control unit generating a second message authentication code that reflects the value of a reception counter which counts the number of reception events using the MAC key, the first electronic control unit verifying whether the message authentication code added to the received data frame is the same as the second message authentication code, and resetting the transmission counter and the reception counter under the condition that the detected state of the vehicle is the predetermined state using the second electronic control unit.

In this manner, the counter values used to generate MAC (the transmission counter and the reception counter) are reset. Accordingly, the security against a brute force attack on MAC from the fraudulent node can be increased.

In addition, the at least one bus may include a plurality of buses. Each of at least one of the plurality of electronic control units may be connected to one of the buses. In the updating a MAC key, the MAC key held by each of the at least one electronic control unit among the electronic control units is updated, and the predetermined state may be determined depending on the bus to which the each of the at least one electronic control unit is connected. In this manner, the MAC key can be updated in accordance with the state of the vehicle appropriate for the bus to which the ECU is connected.

In addition, the at least one bus may include a plurality of buses. Each of the plurality of buses may belong to any one of a plurality of types of group. Each of the electronic control units may be connected to any one of the buses. In the updating a MAC key, the MAC key held by each of the at least one electronic control unit among the electronic control units may be updated, and the predetermined state may be determined depending on the group to which the bus to which the each of the at least one electronic control unit is connected belongs. In this manner, the MAC key can be updated in accordance with the state of the vehicle appropriate for the group to which the bus to which the ECU is connected belongs.

In addition, in the updating a MAC, the MAC key may be updated if the detected state of the vehicle is the predetermined state at a timing at which a quantity of a given type counted since previous updating of the MAC key reaches a predetermined quantity. In this manner, the MAC key can be updated at predetermined intervals.

In addition, in the updating a MAC, if the detected state of the vehicle is not the predetermined state at a timing at which a quantity of a given type counted since previous updating of the MAC key reaches a predetermined quantity, the MAC key may be updated at a timing at which the detected state of the vehicle changes to the predetermined state. In this manner, if a predetermined period of time has elapsed since the previous updating of the MAC key, the update can be performed immediately after the state of the vehicle changes to the predetermined state.

In addition, the predetermined state may be a state in which the vehicle is not traveling. Furthermore, the state in which the vehicle is not traveling may be a state in which the vehicle is parking. In this manner, for example, an increase in the processing load on the ECU during traveling of the vehicle due to updating of the MAC key can be prevented.

According to another aspect of the present disclosure, an in-vehicle network system including a plurality of electronic control units that each communicate a data frame having a message authentication code (MAC) added thereto with one another via at least one bus in accordance with Controller Area Network (CAN) protocol is provided. The in-vehicle network system includes a first electronic control unit including one or more memories and circuitry which, in operation, holds a first MAC key used to generate the message authentication code, generates a first message authentication code using the first MAC key, adds the generated first message authentication code to a data frame identified by a predetermined message ID, sends the data frame, and updates the first MAC key under the condition that a state of a vehicle having the in-vehicle network system mounted therein is a predetermined state; and a second electronic control unit including one or more memories and circuitry which, in operation, holds a second MAC key used to generate the message authentication code, generates a second message authentication code using the second MAC key, receives a data frame identified by the predetermined message ID, verifies whether the message authentication code added to the received data frame is the same as the second message authentication code, and updates the second MAC key under the condition that the state of the vehicle is a predetermined state. In this manner, the MAC key used to generate MAC to be added to a message or used to verify a message can be appropriately updated among the ECUs that transmit CAN frames (messages). Accordingly, the security against a brute force attack on the MAC from the fraudulent node can be increased.

In addition, when updating the first MAC key, the circuitry of the first electronic control unit determines whether the state of the vehicle is a predetermined state when receiving a particular frame identified by a predetermined particular message ID and updates the first MAC key if the state of the vehicle is the predetermined state, and when updating the second MAC key, the circuitry of the second electronic control unit determines whether the state of the vehicle is a predetermined state when receiving a particular frame identified by a predetermined particular message ID and updates the second MAC key if the state of the vehicle is the predetermined state.

In this manner, each of the ECUs can easily synchronize the update timing of the MAC key using the receipt timing of the particular frame.

According to still another aspect of the present disclosure, an electronic control unit for operating in accordance with Controller Area Network (CAN) protocol, comprising one or more memories and circuitry which, in operation: holds a MAC key used to generate a message authentication code (MAC); generates the message authentication code using the held MAC key; and updates the held MAC key under the condition that a state of a vehicle having the electronic control unit mounted therein is a predetermined state. In this manner, the MAC key used to generate MAC to be added to a CAN frame or used to verify a CAN frame can be updated at a timing synchronized with the other ECUs that can recognize the state of the vehicle. Accordingly, the MAC key can be appropriately updated and, thus, the security against a brute force attack from the fraudulent node against the MAC in an in-vehicle network system including the ECU can be increased.

It should be noted that these general and specific aspects may be implemented as a system, a method, an integrated circuit, a computer program, or a computer-readable storage medium, such as a CD-ROM, or any combination of a system, a method, an integrated circuit, a computer program, and a computer-readable storage medium.

An in-vehicle network system including a fraud detecting ECU according to an embodiment is described below with reference to the accompanying drawings. Each of the embodiments described below is a particular example of the present disclosure. Accordingly, a value, a shape, a material, a constituent element, the positions and the connection form of the constituent elements, steps (processes), and the sequence of the steps used in the following embodiments are only examples and shall not be construed as limiting the scope of the present disclosure. In addition, among the constituent elements in the embodiments described below, the constituent element that does not appear in an independent claim is described as an optional constituent element. In addition, all the drawings are schematic illustrations and, thus, are not exactly precisely illustrated.

First Embodiment

According to an embodiment of the present disclosure, an in-vehicle network system 10 that achieves an update processing method for performing an update process related to updating data used to generate MAC in accordance with the state of a vehicle is described below with reference to the accompanying drawings.

1.1 Overall Configuration of in-Vehicle Network System

FIG. 1 illustrates the overall configuration of the in-vehicle network system 10 according to a first embodiment. The in-vehicle network system 10 is an example of an in-vehicle network system that performs communication in accordance with the CAN protocol. In addition, the in-vehicle network system 10 is a network communication system in a motor vehicle having a variety of devices mounted therein, such as a control unit and a sensor. The in-vehicle network system 10 includes a bus 200 and nodes connected to the bus, such as ECUs 100a to 100d connected to a variety of devices. Note that the in-vehicle network system 10 further includes ECUs (not illustrated in FIG. 1) other than the ECUs 100a to 100d. However, for convenience of description, the following description is given with reference to only the ECUs 100a to 100d. The ECU is a unit including, for example, digital circuits, such as a processor (a microprocessor) and a memory, analog circuits, and a communication circuit. Examples of the memory includes a ROM and a RAM, which can store a control program (a computer program) executed by the processor. For example, when the processor operates in accordance with the control program (the computer program), the ECU can provide a variety of functions. Note that the computer program is formed from a plurality of instruction codes that instruct the processor to operate so that a predetermined function is provided. Hereinafter, description is given under the assumption that a fraudulent ECU that sends a fraudulent data frame may be connected to the bus 200.

Each of the ECUs 100a to 100d is connected to the bus 200. The ECUs 100a to 100d are connected to an engine 310, a brake 320, a door open/close sensor 330, and a window open/close sensor 340, respectively. Each of the ECUs 100a to 100d acquires the state of the device connected thereto (e.g., the engine 310) and periodically sends, for example, a frame indicating the state (a data frame described below) to a network (i.e., the bus).

In the in-vehicle network system 10, each of the ECUs sends and receives a frame in accordance with the CAN protocol. Frames defined by the CAN protocol include a data frame, a remote frame, an overload frame, and an error frame. For convenience of description, the following description is mainly based on a data frame and an error frame.

1.2 Data Frame Format

A data frame, which is one of the frames used in a network based on the CAN protocol, is described below.

Figure 2:
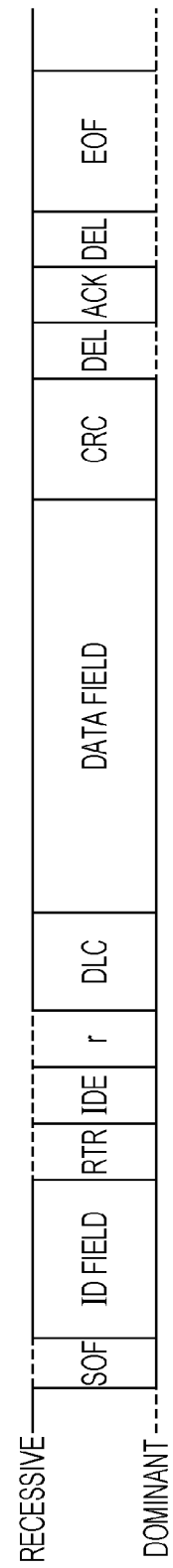
FIG. 2 illustrates the format of a data frame defined by the CAN protocol.

FIG. 2 illustrates the format of a data frame defined by the CAN protocol. The data frame having a standard ID format defined by the CAN protocol is illustrated in FIG. 2. The data frame includes an SOF (Start Of Frame) field, an ID field, an RTR (Remote Transmission Request) field, an IDE (Identifier Extension) field, a reservation bit "r", a DLC (Data Length Code) field, a data field, a CRC (Cyclic Redundancy Check) sequence field, a CRC delimiter field "DEL", an ACK (Acknowledgement) slot field, an ACK delimiter field "DEL", and an EOF (End Of Frame) field.

The SOF field is formed from one dominant bit. When the bus is idle, the state of the bus is recessive. By changing the state of the bus from recessive to dominant using SOF, the notice of start of frame transmission is given.

The ID field is a 11-bit field. The ID field includes an ID (a message ID) that is a value indicating the type of data. In order to perform communication arbitration using the ID field, the design is such that if a plurality of nodes simultaneously start transmission, a frame having a lower ID value has a higher priority.

RTR is a value for distinguishing a data frame from a remote frame. In data frames, the RTR field is formed from one dominant bit.

Each of IDE and "r" is formed from one dominant bit.

DLC is of 4 bits. DLC indicates the length of the data field. Note that IDE, "r", and DLC are collectively referred to as a "control field".

The data field indicates the data to be transmitted, where the maximum length of the data field is 64 bits. The length can be controlled to 8 to 64 bits (multiple of 8 bits). The specification of data to be transmitted is not defined by the CAN protocol and is defined by the in-vehicle network system 10. Accordingly, the specification of the data depends on, for example, the type of vehicle and the manufacturer (the maker).

The CRC sequence field is a 15-bit field. The CRC sequence is calculated using the transmitted values of SOF, the ID field, the control field, and the data field.

The CRC delimiter is formed from one recessive bit. The CRC delimiter is a delimiter symbol that indicates termination of the CRC sequence. Note that the CRC sequence field and the CRC delimiter field are collectively referred to as a "CRC field".

The ACK slot field is a 1-bit field. The sender node sets the ACK slot to recessive and sends data. If a receiver node successfully receives the data up to the CRC sequence, the receiver node sets the ACK slot to dominant and sends the data. The dominant has a priority over the recessive. Accordingly, if the ACK slot is dominant after transmission, the sender node can be aware that any one of the receiver nodes has successfully received the data.

The ACK delimiter is formed from one recessive bit. The ACK delimiter is a delimiter symbol that indicates termination of ACK.

The EOF field is formed from 7 recessive bits. EOF indicates termination of the data frame.

1.3 Configuration of ECU

Figure 3:
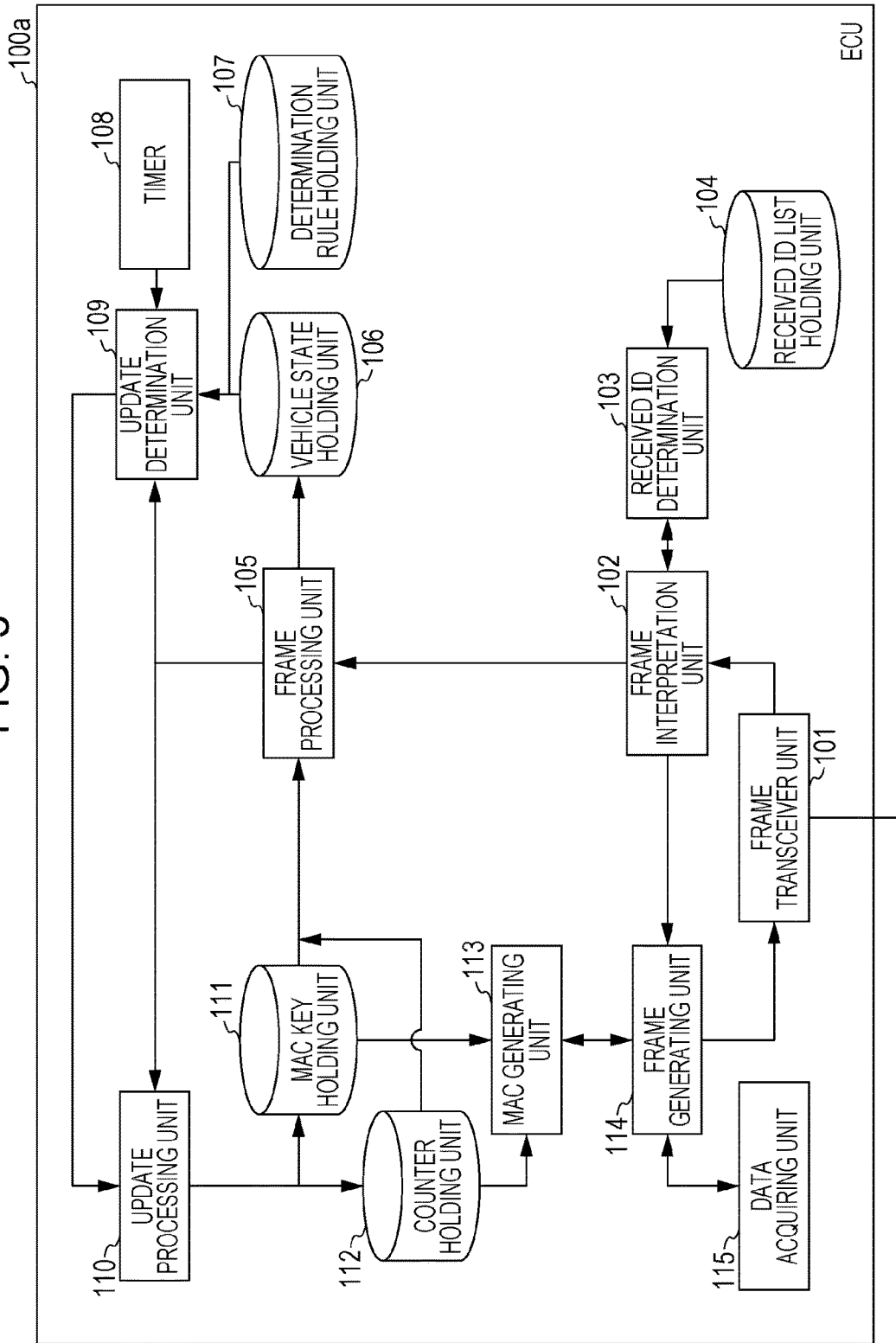
FIG. 3 is the configuration diagram of an ECU according to the first embodiment.

FIG. 3 is the configuration diagram of the ECU 100a. The ECU 100a includes a frame transceiver unit 101, a frame interpretation unit 102, a received ID determination unit 103, a received ID list holding unit 104, a frame processing unit 105, a vehicle state holding unit 106, a determination rule holding unit 107, a timer 108, an update determination unit 109, an update processing unit 110, a MAC key holding unit 111, a counter holding unit 112, a MAC generating unit 113, a frame generating unit 114, and a data acquiring unit 115. These constituent elements are functional constituent elements. The functions of the constituent elements are realized by the communication circuit and one of, for example, the processor that executes the control program stored in the memory and a digital circuit of the ECU 100a. Note that each of the ECUs 100b to 100d has substantially the same configuration as that of the ECU 100a.

The frame transceiver unit 101 sends and receives a frame to and from the bus 200 in accordance with the CAN protocol. The frame transceiver unit 101 receives a frame from the bus 200 bit by bit and transfers the frame to the frame interpretation unit 102. In addition, the frame transceiver unit 101 sends the information in a frame received from the frame generating unit 114 to the bus 200.

The frame interpretation unit 102 receives the value of the frame from the frame transceiver unit 101 and interprets the value so that the value is mapped to the fields of the frame format defined by the CAN protocol. The value that is determined to correspond to the ID field is transferred to the received ID determination unit 103. In accordance with the result of determination sent from the received ID determination unit 103, the frame interpretation unit 102 determines whether the value of the ID field and the data field that follows the ID field are transferred to the frame processing unit 105 or reception of the frame is stopped after the result of determination is received (i.e., interpretation of the frame is stopped). In addition, if determining that the frame does not follow the CAN protocol, the frame interpretation unit 102 sends, to the frame generating unit 114, a notification instructing the frame generating unit 114 to send an error frame. Furthermore, upon receiving an error frame, that is, upon interpreting the frame as an error frame using the value of the received frame, the frame interpretation unit 102 discards the subsequent part of the frame. That is, the frame interpretation unit 102 stops interpreting the frame. Still furthermore, the frame interpretation unit 102 sends, to the frame processing unit 105, the information in the ACK slot of the data frame.

The received ID determination unit 103 receives the value of the ID field sent from the frame interpretation unit 102 and determines whether to receive the fields subsequent to the ID field in accordance with a list of message IDs held by the received ID list holding unit 104. The received ID determination unit 103 sends the result of the determination to the frame interpretation unit 102.

The received ID list holding unit 104 holds the received ID list, which is a list of IDs (message IDs) to be received by the ECU 100a. FIG. 4 illustrates an example of the received ID list.

The frame processing unit 105 acquires, from the MAC key holding unit 111, a MAC key corresponding to a message ID for the message IDs and the values of the data fields of all the data frames received from the frame interpretation unit 102. In addition, the frame processing unit 105 acquires, from the counter holding unit 112, a counter value corresponding to the message ID. Thereafter, the frame processing unit 105 verifies the MAC included in the data field. The MAC is verified to verify the validity of the data frame (the message). More specifically, the frame processing unit 105 generates MAC through calculation in the same manner as the MAC generating unit 113 (described in more detail below) and compares the generated MAC with the MAC in the data field. If the MACs are the same, the frame processing unit 105 determines that the verification is successful. However, if MACs are not the same, the frame processing unit 105 determines that an error has occurred (i.e., the verification has failed). If it is determined that an error has occurred (i.e., the verification has failed) as a result of verification, the frame processing unit 105 notifies the frame interpretation unit 102 of the error and stops the subsequent reception process. In addition, if the frame processing unit 105 receives a frame indicating the state of the vehicle (the vehicle state), the frame processing unit 105 notifies the vehicle state holding unit 106 of the vehicle state in accordance with the frame. In addition, the frame processing unit 105 performs different processes for different ECUs in accordance with the data in the received frame. For example, the ECU 100a connected to the engine 310 outputs alarm sound when the vehicle travels at 30 km per hour or higher and if a door is open. The ECU 100a has, for example, a speaker that outputs the alarm sound. In addition, the frame processing unit 105 of the ECU 100a manages the data received from the other ECUs (e.g., the information indicating the states of doors) and performs, for example, a process for outputting alarm sound under a predetermined condition on the basis of the travel speed acquired from the engine 310. The ECU 100c performs a process for outputting alarm sound if a door is open under the condition that the brake is not applied. The ECUs 100b and 100d perform no process. Note that the ECUs 100a to 100d may have functions other than the above-described functions. In addition, the frame processing unit 105 examines the value of the ACK slot in the data frame and determines whether the frame sent from the ECU 100a has been normally received by the other ECUs and sends the result of the determination to the update processing unit 110. Note that the verification of the MAC is performed by the frame processing unit 105. Accordingly, even when a fraudulent ECU is connected to the bus 200 and sends a fraudulent frame, verification fails and, thus, control of the vehicle based on the fraudulent frame, for example, can be prevented.

The vehicle state holding unit 106 holds the current vehicle state (i.e., the latest vehicle state among the vehicle states sent so far) received from the frame processing unit 105. Particular examples of the vehicle state include "traveling", "stopping", and "parking". For example, the in-vehicle network system 10 can include an ECU (not illustrated) that is connected to, for example, a sensor of the gear of the vehicle and that identifies the vehicle state from the gear position (e.g., parking, neutral, first gear, or second gear) and sends a frame indicating the identified vehicle state to the bus 200. In addition, the in-vehicle network system 10 may include an ECU (not illustrated) that identifies the vehicle state on the basis of the information sent from a plurality of ECUs and sends a frame indicating the identified vehicle state.

The determination rule holding unit 107 holds a determination rule defining a correspondence between each of the vehicle states and information as to whether an update process is performed. FIG. 5 illustrates an example of the determination rule in accordance with a vehicle state.

The timer 108 is a clock mechanism that counts up the time value corresponding to an elapsed time. The timer 108 sends, to the update determination unit 109, the elapsed time from completion of the previous update process. In addition, the timer 108 resets the clock on the basis of an update process completion message received from the update determination unit 109.

The update determination unit 109 acquires the current vehicle state from the vehicle state holding unit 106 if a predetermined update timing is reached on the basis of the timer 108 and determines whether the update process related to updating data used to generate a MAC (i.e., a MAC key and a counter value) is to be performed in accordance with the determination rule acquired from the determination rule holding unit 107. More specifically, the update process includes a key update process for updating the value of the MAC key serving as a key used to generate MAC and a counter reset process for resetting the counter value that is reflected in MAC (i.e., updating the counter value to a particular value, such as zero). If it is determined that the data used to generated MAC is to be updated, the update determination unit 109 notifies the update processing unit 110 of that information. However, if it is determined that the data used to generated MAC is not updated, the update determination unit 109 waits for a change in the vehicle state. If the update process has been completed, the update determination unit 109 sends an update process completion message to the timer 108. Thus, the timer 108 is reset. The update timing is identified on the basis of the timer 108. The update timing is determined as the time when a predetermined period of time (e.g., 6 hours or 1 day) elapses.

The update processing unit 110 performs the update process in response to a notification received from the update determination unit 109. That is, upon receiving the notification from the update determination unit 109, the update processing unit 110 acquires the MAC key held by the MAC key holding unit 111 and caches the MAC key as an old key and generates a new key serving as a candidate of the MAC key. Thereafter, the update processing unit 110 sends the generated MAC key to the MAC key holding unit 111. In addition, upon receiving a notification from the update determination unit 109, the update processing unit 110 acquires the counter value held by the counter holding unit 112 and caches the counter value (i.e., temporarily stores the counter value in a storage medium). Thereafter, the update processing unit 110 instructs the counter holding unit 112 to reset the counter value. When the update processing unit 110 receives, from the frame interpretation unit 102, a notification indicating that normal reception cannot be confirmed and if the update processing unit 110 has the caches of the MAC key and the counter value (i.e., the update processing unit 110 temporarily holds the MAC key and the counter value in a storage medium), the update processing unit 110 sends the cached key to the MAC key holding unit 111 and sends the cached counter value to the counter holding unit 112. In addition, when the update processing unit 110 receives, from the frame interpretation unit 102, a notification indicating that normal reception has been confirmed and if the update processing unit 110 has the caches of the MAC key and the counter value, the update processing unit 110 deletes the caches of the MAC key and the counter value (i.e., considers the temporarily stored values as being unavailable from now on by, for example, deleting the values from the storage medium). As the method for generating the MAC key, the following method is used. For example, the current MAC key is input to a predetermined one-way function (e.g., a hash function), and the derived result is defined as a candidate of a new MAC key.

The MAC key holding unit 111 is formed from a storage medium, such as a memory. The MAC key holding unit 111 holds, for each of the message IDs, a MAC key required for the MAC generating unit 113 and the frame processing unit 105 to calculate MAC. In response to receipt of the MAC key from the update processing unit 110, the MAC key holding unit 111 discards the held key and holds the received key as the MAC key.

The counter holding unit 112 is configured so as to include a storage medium, such as a memory. The counter holding unit 112 holds, for each of the message IDs, a counter value required for the MAC generating unit 113 and the frame processing unit 105 to calculate MAC. Note that the counter value held by the counter holding unit 112 is incremented (by one) if a frame is normally sent. As this method, when a data frame is sent, the counter value is used as a transmission counter, and the number of transmission events is counted. In contrast, when a data frame is received, the counter value is used as a reception counter, and the number of reception events is counted. For example, the ECU 100*a* that sends a data frame having a message ID of "1" uses, as a transmission counter, the counter value corresponding to a message ID of "1" held by the counter holding unit 112 and increments the transmission counter each time the ECU 100*a* sends a frame. In addition, the ECU 100*b* that receives a data frame having a message ID of "1" uses, as a reception counter, the counter value corresponding to a message ID of "1" held by the counter holding unit 112 and increments the reception counter each time the sent data frame is normally received. Furthermore, upon receiving a counter value from the update processing unit 110, the counter holding unit 112 holds the counter value. In addition, upon receiving a notification instructing a reset operation from the update processing unit 110, the counter holding unit 112 resets the held counter value. Through the reset operation, the counter value is updated to a particular value, such as zero.

The MAC generating unit 113 calculates MAC by applying the MAC key held by the MAC key holding unit 111 (i.e., the MAC key corresponding to the message ID) to a value (a concatenated value) obtained by concatenating the message ID and the value of the data for the data field sent from the frame generating unit 114 and the counter value held by the counter holding unit 112 (i.e., the counter value corresponding to the message ID). That is, the MAC generating unit 113 derives the value of MAC through calculation. Thereafter, the MAC generating unit 113 sends the MAC (the result of calculation) to the frame generating unit 114. In this example, HMAC (Hash-based Message Authentication Code) (refer to RFC2104 HMAC: Keyed-Hashing for Message Authentication) is employed as the MAC calculation method. Calculation is performed on the value obtained by applying padding to the above-described concatenated value so that the concatenated value has a predetermined block length (e.g., 4 bytes) using the MAC key. The first 4 bytes of the resultant value of the calculation is used as a MAC value. Note that the size of the MAC value and the calculation method in this example are only examples, and the size of the MAC value and the calculation method are not limited thereto. The MAC is generated so as to reflect the counter value that is incremented each time a frame is sent. Accordingly, even when data frames that contain the same data value are sent a plurality of times, the MAC provided in (i.e., appended to) the data frame changes each time the frame is sent.

The frame generating unit 114 configures an error frame in response to a notification that instructs transmission of the error frame and that is sent from the frame interpretation unit 102 and sends the error frame to the frame transceiver unit 101 to cause the frame transceiver unit 101 to send the error frame. In addition, the frame generating unit 114 sends, to the MAC generating unit 113, a predetermined message ID and the value of data sent from the data acquiring unit 115 (the value of data for the data field) to receive MAC. The frame generating unit 114 configures a frame on the basis of the predetermined message ID, the sent MAC, and the sent value of data for the data field and sends the frame to the frame transceiver unit 101. Note that the information in the frame sent from each of the ECUs 100*a* to 100*d* is described below with reference to FIGS. 6 to 9.

The data acquiring unit 115 acquires the data indicating the state of, for example, the device or the sensor connected to the ECU and sends the data to the frame generating unit 114.

1.4 Example of Received ID List

FIG. 4 illustrates an example of the received ID list held by each of the ECUs 100*a* to 100*d*. The example of the received ID list illustrated in FIG. 4 is used to selectively receive frames having IDs (message IDs) of "1", "2", "3", and "4" and process the received frame. For example, if the received ID list illustrated in FIG. 4 is held by the received ID list holding unit 104 of an ECU, interpretation performed on a frame having a message ID that is not any one of "1", "2", "3", and "4" by the frame interpretation unit 102 is stopped after the ID field is interpreted.

1.5 Example of Determination Rule

FIG. 5 illustrates an example of a determination rule held by each of the ECUs 100*a* to 100*d*. The determination rule determines the state of the vehicle having the in-vehicle network system 10 mounted therein (the vehicle state) as the condition that determines whether the update process is to be performed. If the vehicle state is a predetermined state defined by the determination rule (e.g., "parking"), the performance of the update process is allowed. According to the determination rule illustrated in FIG. 5, if the vehicle state is "traveling" or "stopping", the update process is not performed even when an update timing (i.e., a timing at which key updating and counter resetting are to be performed) is reached, and the processing enters a wait mode. Thereafter, if the vehicle state is changed to "parking", the update process is performed. In addition, when the vehicle state is "parking" and if an update timing is reached, the update process is performed.

1.6 Example of Transmission Frame of ECU Related to Engine

FIG. 6 illustrates an example of an ID (a message ID) and the data field (the data) of a data frame sent from the ECU 100*a* connected to the engine 310. The message ID of a frame sent from the ECU 100*a* is "1". In FIG. 6, the data is split into bytes with a space. The first byte represents the travel speed (km/hour), the next byte represents the counter value, and the following four bytes represent the MAC. Note that in the example illustrated in FIG. 6, MAC is written in hexadecimal. The travel speed represented by the first byte is in the range from a minimum of 0 (km/hour) to a maximum of 180 (km/hour). FIG. 6 illustrates an example of the message IDs and the data in the top to bottom rows that correspond to the frames sequentially sent from the ECU 100*a*. The counter value gradually increases, and the travel speed increases from 0 km/hour in increments of 1 km/hour.

1.7 Example of Transmission Frame of ECU Related to Brake

FIG. 7 illustrates an example of an ID (a message ID) and the data field (the data) of a data frame sent from the ECU 100b connected to the brake 320. The message ID of a frame sent from the ECU 100b is "2". In FIG. 7, the data is split into bytes with a space. The first byte represents the braking level of the brake (%), the next byte represents the counter value, and the following four bytes represent the MAC. Note that in the example illustrated in FIG. 7, MAC is written in hexadecimal. The braking level represented by the first byte is in the range from no braking (0(%)) to the maximum braking (100(%)). FIG. 7 illustrates an example of the message IDs and the data in the top to bottom rows that correspond to the frames sequentially sent from the ECU 100b. The counter value gradually increases, and the braking level gradually decreases from 100%.

1.8 Example of Transmission Frame of ECU Related to Door Open/Close Sensor

FIG. 8 illustrates an example of an ID (a message ID) and the data field (the data) of a data frame sent from the ECU 100c connected to the door open/close sensor 330. The message ID of a frame sent from the ECU 100c is "3". In FIG. 8, the data is split into bytes with a space. The first byte represents the door open/close state, the next byte represents the counter value, and the following four bytes represent the MAC. Note that in the example illustrated in FIG. 8, MAC is written in hexadecimal. The door open/close state represented by the first byte is "1" if the door is open and is "0" if the door is closed. FIG. 8 illustrates an example of the message IDs and the data in the top to bottom rows that correspond to the frames sequentially sent from the ECU 100c. The counter value gradually increases, and the door open state is gradually changed to the door closed state.

1.9 Example of Transmission Frame of ECU Related to Window Open/Close Sensor FIG. 9 illustrates an example of an ID (a message ID) and the data field (the data) of a data frame sent from the ECU 100d connected to the window open/close sensor 340. The message ID of a frame sent from the ECU 100d is "4". In FIG. 9, the data is split into bytes with a space. The first byte represents the degree of the window opening (%), the next byte represents the counter value, and the following four bytes represent the MAC. Note that in the example illustrated in FIG. 9, MAC is written in hexadecimal. The degree of the window opening represented by the first byte is in the range from fully closed (0(%)) to fully open (100(%)). FIG. 9 illustrates an example of the message IDs and the data in the top to bottom rows that correspond to the frames sequentially sent from the ECU 100d. The counter value gradually increases, and the window gradually opens from the fully closed state.

1.10 Update Process

Provision of MAC when a data frame is sent and an update process related to updating data that is required for generating MAC used to verify the received MAC when the data frame is received are described below. These processes are performed by each of the above-described ECUs.

Provision of MAC and updating related to a MAC key and the counter value used to verify the MAC for each of the messages need to be synchronously performed by the ECUs. Hereinafter, the update process related to MAC corresponding to a message ID is described with reference to an example in which the ECU 100a sends a data frame for ensuring synchronization of the update processes (referred to as an "update frame") to the bus 200 and one of the other ECUs (e.g., the ECU 100b) receives the update frame from the bus 200. Note that any one of the ECUs may send an update frame. For example, the ECU 100a that repeatedly sends a data frame having a message ID of "1" may send an update frame for synchronizing the update processes related to MAC corresponding to the message ID "1".

Figure 10:
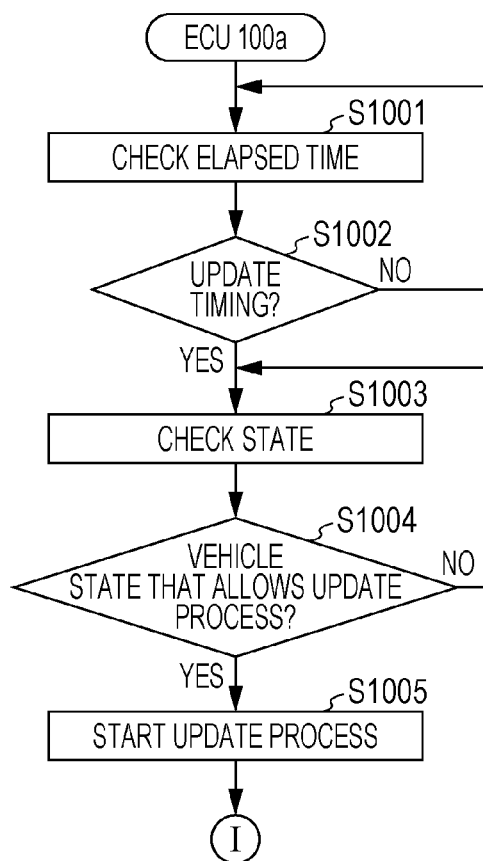
FIG. 10 is a flowchart illustrating an example of an update process performed by the ECU and a process related to determination of start of the update process (to be continued to FIG. 11)
Figure 11:
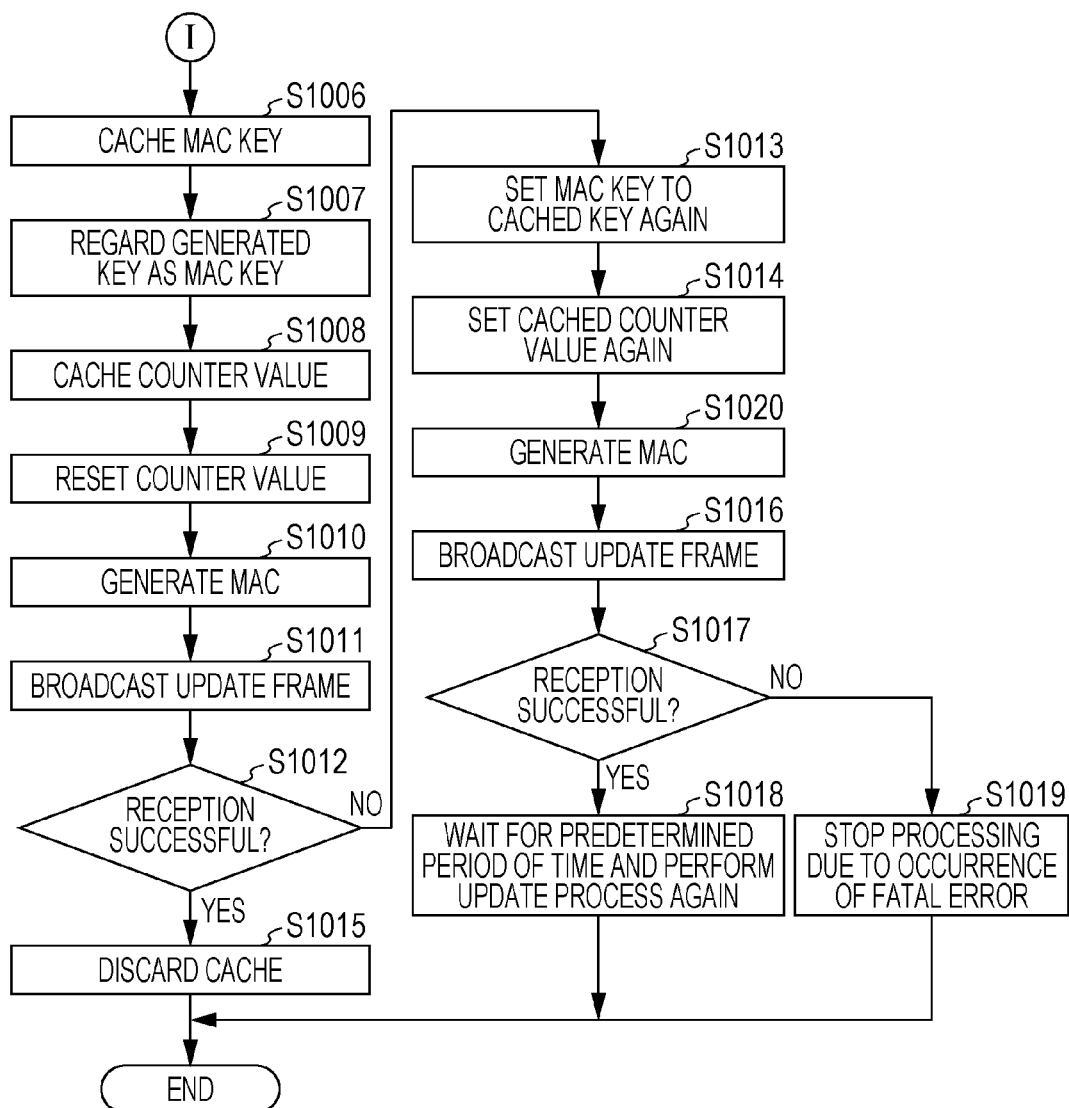
FIG. 11 is a flowchart illustrating the example of the update process performed by the ECU and the process related to determination of start of the update process (a continuation of FIG. 10)

FIGS. 10 and 11 are flowcharts illustrating an example of the update process performed by the ECU 100a and a process related to determination of start of the update process. The operation performed by the ECU 100a is described below with reference to FIGS. 10 and 11.

The ECU 100a checks the elapsed time since the previous update process using the timer 108 disposed therein (step S1001). Thereafter, the ECU 100a determines whether the update timing is reached (step S1002). If the update timing is not reached, the ECU 100a repeats checking the elapsed time using the timer 108. However, if the update timing is reached, the ECU 100a checks the current vehicle state (step S1003).

The ECU 100a determines whether to perform the update process using the current vehicle state on the basis of the determination rule held by the determination rule holding unit 107 (step S1004). The ECU 100a does not perform the update process and continues to check the vehicle state until the vehicle state changes to a state determined by the determination rule that allows the update process (step S1003). If the vehicle state is the state determined by the determination rule that allows the update process, the ECU 100a starts the update process described in step S1006 and the subsequent steps in FIG. 11 (step S1005). According to the example of the determination rule illustrated in FIG. 5, if the vehicle state is "traveling" or "stopping", the ECU 100a waits for a change in the vehicle state to "parking" and performs the update process. However, if the vehicle state is "parking", the ECU 100a immediately performs the update process (step S1005).

After the ECU 100a starts the update process, the ECU 100a caches the MAC key held by the MAC key holding unit 111 as an old key (step S1006). Subsequently, the ECU 100a generates a new key that serves as a candidate of a MAC key and stores the generated key in the MAC key holding unit 111 (step S1007).

In addition, the ECU 100a caches the counter value held by the counter holding unit 112 (step S1008). Subsequently, the ECU 100a resets the counter value held by the counter holding unit 112 to zero (step S1009).

Subsequently, the ECU 100a generates MAC using a predetermined message ID, the data value for the data field, the counter value held by the counter holding unit 112 after the resetting operation, and the newly generated MAC key held by the MAC key holding unit 111 (step S1010). Thereafter, the ECU 100a generates an update frame including the message ID, the data value for the data field, and the MAC generated in step S1010 and broadcasts the update frame (i.e., sends the update frame to the bus 200) (step S1011).

After sending the update frame in step S1011, the ECU 100a determines whether a node (an ECU) that has succeeded in receiving the update frame (i.e., that has normally received the update frame) is present by examining the value of the ACK slot (step S1012). If a node that has succeeded in receiving the update frame is present, the ECU 100a discards the cache (step S1015) and completes the update process.

If, as a result of the determination in step S1012, a node that has succeeded in receiving the update frame is not present, the ECU 100a causes the MAC key holding unit 111 to hold the cached old key as the MAC key again (step S1013). In addition, the ECU 100a causes the counter holding unit 112 to hold the cached counter value as the counter value again (step S1014). Thereafter, the ECU 100a generates MAC using a predetermined message ID, the data value for the data field, the counter value that is stored in the counter holding unit 112 and that is reset from the cache, and the MAC key that is stored in the MAC key holding unit 111 and that is reset from the cache (step S1020). Subsequently, the ECU 100a generates an update frame including the message ID, the data value for the data field, and the MAC generated in step S1020 and broadcasts the update frame (i.e., sends the update frame to the bus 200) (step S1016).

After sending the update frame in step S1016, the ECU 100a determines whether a node (an ECU) that has succeeded in receiving the update frame is present by examining the value of the ACK slot (step S1017). If a node that has succeeded in receiving the update frame is present, the ECU 100a waits for a predetermined period of time (e.g., several seconds or several minutes), and the processing performed by the ECU 100a returns to step S1006 again, where the update process is performed (step S1018). However, if, in step S1017, a node that has succeeded in receiving the update frame is not present, the ECU 100a determines that a fatal error has occurred and, thus, stops the update process (step S1019). When the ECU 100a stops the update process, the ECU 100a may perform a process such as announcing the occurrence of the error or recording a log. Note that the occurrence of the error can be announced by, for example, sending a data frame indicating the occurrence of the error, displaying that information on a display, outputting audio information, or emitting light.

Figure 12:
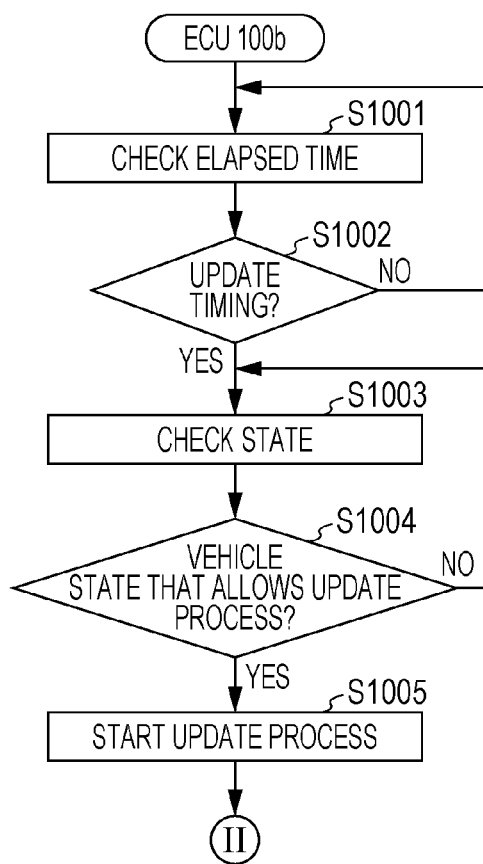
FIG. 12 is a flowchart illustrating an example of an update process performed by the ECU and a process related to determination of start of the update process (to be continued to FIG. 13)
Figure 13:
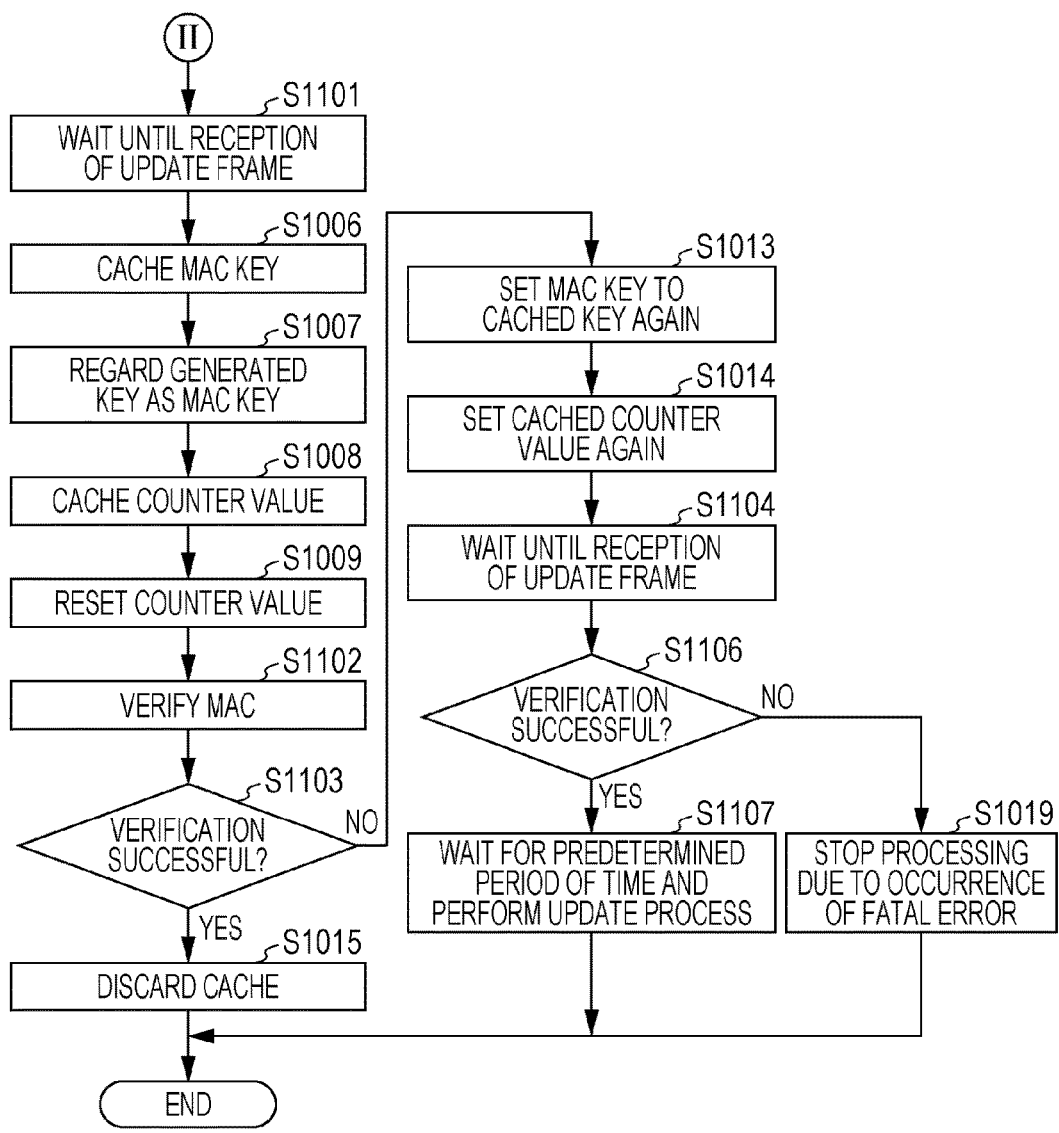
FIG. 13 is a flowchart illustrating the example of the update process performed by the ECU and the process related to determination of start of the update process (a continuation of FIG. 12)

FIGS. 12 and 13 are flowcharts of an example of the update process performed by the ECU 100b and a process related to determination of start of the update process. Note that among processing procedures (steps) illustrated in FIGS. 12 and 13, the step that is the same as that in FIG. 10 or 11 is identified with the same reference numeral, and description of the step is not repeated as needed. In addition, each of the ECU 100c and the ECU 100d can perform an update process that is the same as that of the ECU 100b. The operation performed by the ECU 100b is described below with reference to FIGS. 12 and 13.

The ECU 100b checks the elapsed time since the previous update process (step S1001). Thereafter, the ECU 100b determines whether the elapsed time is the predetermined period of time and, thus, the update timing is reached (step S1002). If the update timing is not reached, the ECU 100b repeats checking the elapsed time until the elapsed time reaches the predetermined period of time. However, if the update timing is reached, the ECU 100b checks the current vehicle state (step S1003).

The ECU 100b determines whether to perform the update process on the basis of the current vehicle state in accordance with the determination rule (step S1004). The ECU 100b does not perform the update process and continues to check the vehicle state until the vehicle state changes to a state determined by the determination rule that allows the update process (step S1003). If the vehicle state is the state determined by the determination rule that allows the update process, the ECU 100b starts the update process described in step S1101 and the subsequent steps in FIG. 13 (step S1005).

After starting the update process, the ECU 100b waits until an update frame is sent over the bus 200, that is, the update frame is received (step S1101).

Subsequently, upon receiving the update frame, the ECU 100b caches the MAC key held by the MAC key holding unit 111 as an old key (step S1006). Subsequently, the ECU 100b generates a new key that serves as a candidate of a MAC key and stores the generated key in the MAC key holding unit 111 (step S1007).

In addition, the ECU 100b caches the counter value held by the counter holding unit 112 (step S1008). Subsequently, the ECU 100b resets the counter value held by the counter holding unit 112 to zero (step S1009).

Subsequently, the ECU 100b generates MAC using a predetermined message ID and the data value in the data field of the received update frame, the counter value held by the counter holding unit 112 after the resetting operation, and the newly generated MAC key held by the MAC key holding unit 111 and, thereafter, verifies the MAC by comparing the generated MAC with the MAC stored in the update frame (step S1102). If the two MACs are the same, the verification is successful. The ECU 100b determines whether the verification of the MAC is successful (step S1103). If the verification of the MAC is successful, the ECU 100b sets the ACK slot to dominant so as to indicate that the reception is successful. Thereafter, the ECU 100b discards the cache (step S1015). Thereafter, the ECU 100b completes the update process.

If, as a result of the determination in step S1103, the verification is not successful, the ECU 100b causes the MAC key holding unit 111 to hold the cached old key as the MAC key again (step S1013). In addition, the ECU 100b causes the counter holding unit 112 to hold the cached counter value as the counter value again (step S1014). Thereafter, the ECU 100b waits until an update frame is sent over the bus 200, that is, an update frame can be received (step S1104).

Subsequently, upon receiving the update frame again, the ECU 100b generates MAC using the message ID and the data value of the data field in the received update frame, the counter value reset in the counter holding unit 112 from the cache, and the MAC key that is reset in the MAC key holding unit 111 from the cache. Thereafter, the ECU 100b compares the generated MAC with the MAC included in the update frame. In this manner, the ECU 100b verifies the MAC (step S1105). The ECU 100b determines whether the verification of the MAC is successful (step S1106). If the verification is successful, the ECU 100b sets the ACK slot to dominant so as to indicate that the reception is successful and waits for a predetermined period of time (which is the same as the predetermined period of time in step S1018 in transmission). Thereafter, the processing performed by the ECU 100b returns to step S1101 again, where the update process is performs (step S1107). However, if, in step S1106, the verification fails, the ECU 100b determines that a fatal error has occurred and, thus, stops the update process (step S1019). When the ECU 100b stops the update process, the ECU 100b may perform a process such as announcing the occurrence of the error or recording a log.

1.11 Effect of First Embodiment

The ECU according to the first embodiment performs the update process related to updating data used to generate MAC (e.g., updating of the MAC key and resetting of the counter value) in accordance with the state of the vehicle. Since such an update process is performed as needed, the security against a brute force attack on MAC from a fraudulent ECU (a fraudulent node) connected to the bus can be increased. Note that the amount of processing performed by the ECU (the processing load) may vary in accordance with the state of the vehicle. Accordingly, for example, updating of the MAC key is performed when the vehicle is in the parking state in which the processing load is low. Thus, the updating can be efficiently performed while avoiding the occurrence of error caused by a delay of the processing, and a plurality of the ECUs (the receiver nodes corresponding to a given sender node of a frame) can be simultaneously synchronized. Note that if the synchronization is not properly performed, a frame sent from a sender node cannot be properly verified by a receiver node after that. In addition, the update process can be performed in accordance with the state of the vehicle so that the update process is avoided if the amount of traffic of the bus is relatively high due to frames sent from the ECUs (e.g., during travelling of the vehicle). There is some correlation between the vehicle state and the processing load on the ECU or the amount of traffic of the bus. Accordingly, it is effective to perform the update process when the vehicle state is an appropriate state. For example, if the update process is performed in the parking state or a state in which the vehicle is not traveling, the processing efficiency of the in-vehicle network system can be advantageously increased and, thus, an increase in the processing load on the ECU during traveling can be prevented. In addition, by appropriately performing the update process in accordance with the state of the vehicle, the occurrence of a communication error in the update process caused by a synchronization error can be prevented.

Second Embodiment

As another embodiment of the present disclosure, an in-vehicle network system 20 including a plurality of buses and a gateway that transfers a frame between the buses is described below with reference to the accompanying drawings. The in-vehicle network system 20 achieves an update processing method for performing an update process related to updating data used to generate MAC in accordance with the state of a vehicle. In the in-vehicle network system 20, each of ECUs performs the update process in accordance with the state of the vehicle and an update start frame sent to a bus to which the ECU is connected.

2.1 Overall Configuration of in-Vehicle Network System

Figure 14:
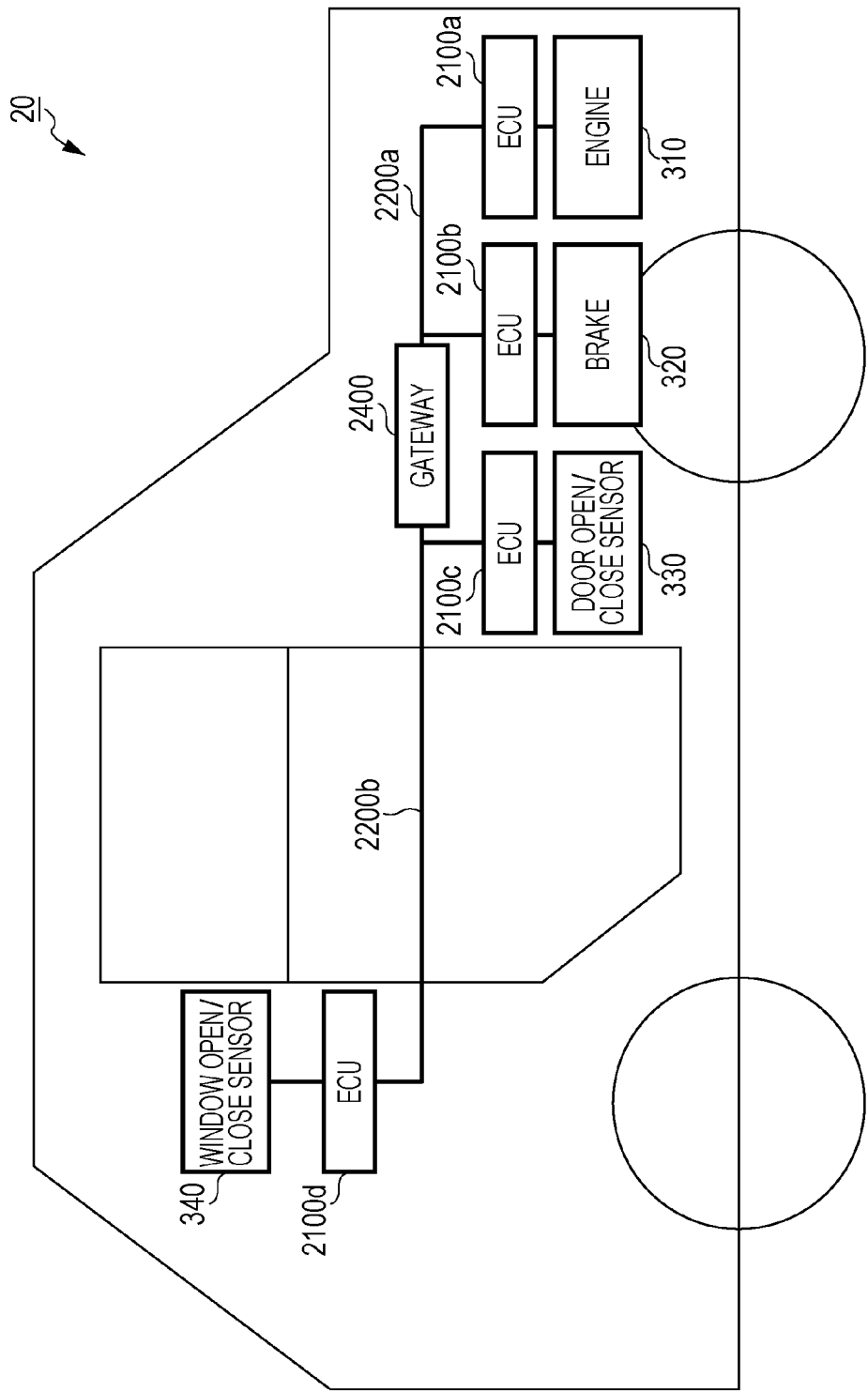
FIG. 14 illustrates the overall configuration of an in-vehicle network system according to a second embodiment.

FIG. 14 illustrates the overall configuration of the in-vehicle network system 20 according to a second embodiment. The in-vehicle network system 20 is achieved by partially modifying the in-vehicle network system 10 according to the first embodiment. The in-vehicle network system 20 is similar to the in-vehicle network system 10, unless expressly specified otherwise. The in-vehicle network system 20 includes buses 2200a and 2200b, a gateway 2400, and nodes connected to the buses, such as ECUs 2100a to 2100d connected to a variety of devices. Among the constituent elements of the in-vehicle network system 20, the constituent element having a function that is the same as in the first embodiment is identified by the same reference numeral, and description of the constituent element is not repeated.

The ECUs 2100a to 2100d are connected to an engine 310, a brake 320, a door open/close sensor 330, and a window open/close sensor 340, respectively. Each of the ECUs 2100a to 2100d acquires the state of the device connected thereto (e.g., the engine 310) and periodically sends a frame indicating the state to a network. In the in-vehicle network system 20, each of the ECUs sends and receives a frame in accordance with the CAN protocol.

The gateway 2400 is one type of ECU. The gateway 2400 is connected to the bus 2200a to which the ECU 2100a and the ECU 2100b are connected and the bus 2200b to which the ECU 2100c and the ECU 2100d are connected. The gateway 2400 has a function of transferring a frame received from one bus to the other. In addition, the gateway 2400 can switch whether a received frame is transferred for each of the buses connected thereto. In addition, the gateway 2400 has a function of sending an update start frame at a timing at which the internal timer indicates a predetermined value. The update start frame is a particular frame identified by a predetermined particular message ID. The update start frame indicates start of the update process. The update start frame effectively works in order for a plurality of ECUs to synchronously perform the update process related to updating data used to generate MAC.

Like the in-vehicle network system 10 according to the first embodiment, the in-vehicle network system 20 can include an ECU (not illustrated) that is connected to, for example, a sensor of the gear of the vehicle and that identifies the vehicle state on the basis of the gear position (e.g., parking, neutral, first gear, or second gear) and sends a frame indicating the identified vehicle state. In addition, the in-vehicle network system 20 may include an ECU (not illustrated) that identifies the vehicle state on the basis of the information sent from a plurality of ECUs and sends a frame indicating the identified vehicle state.

2.2 Configuration of ECU

Figure 15:
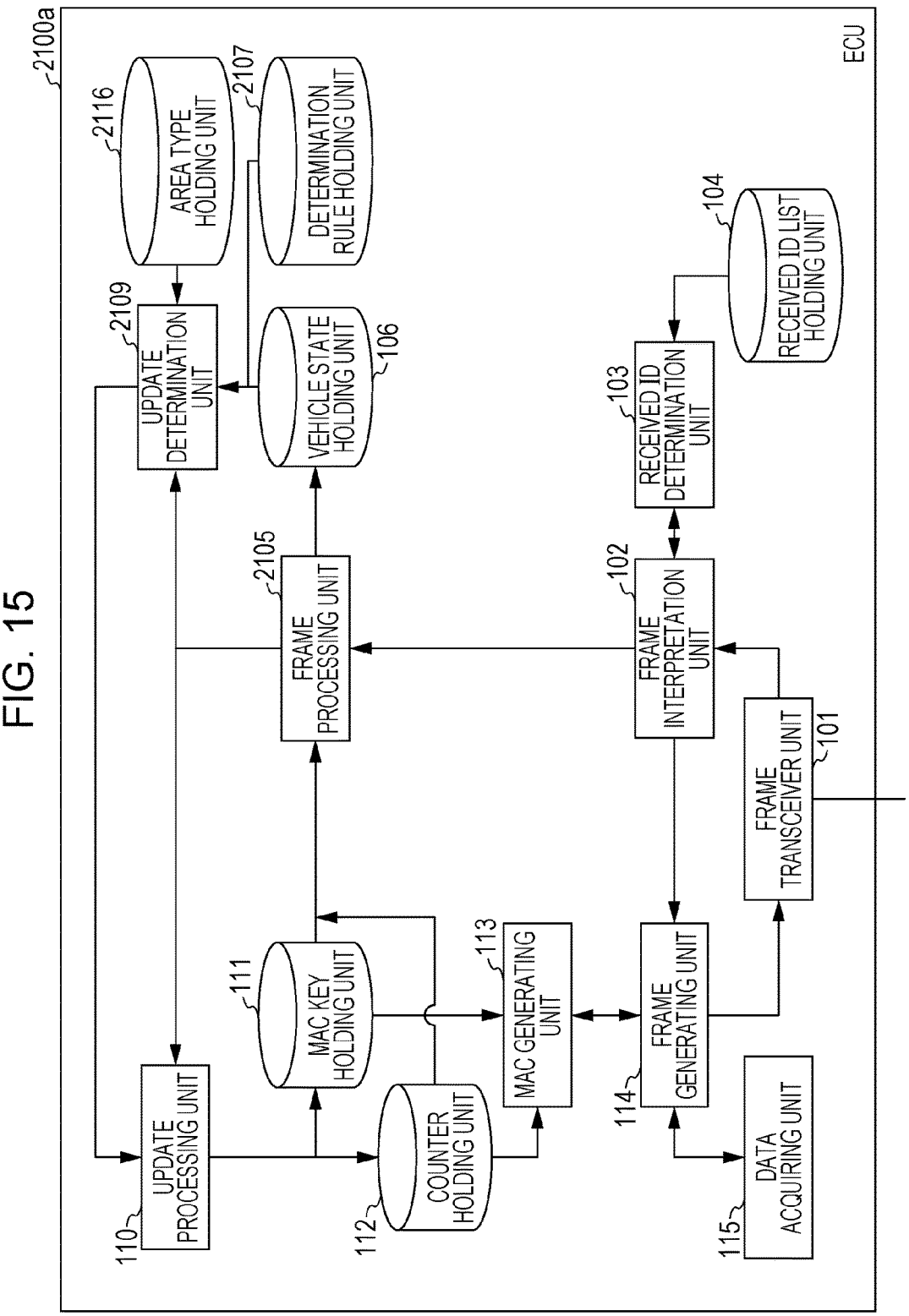
FIG. 15 is the configuration diagram of an ECU according to the second embodiment.

FIG. 15 is the configuration diagram of the ECU 2100a. The ECU 2100a includes a frame transceiver unit 101, a frame interpretation unit 102, a received ID determination unit 103, a received ID list holding unit 104, a frame processing unit 2105, a vehicle state holding unit 106, a determination rule holding unit 2107, an update determination unit 2109, an update processing unit 110, a MAC key holding unit 111, a counter holding unit 112, a MAC generating unit 113, a frame generating unit 114, a data acquiring unit 115, and an area type holding unit 2116. These constituent elements are functional constituent elements. The functions of the constituent elements are realized by the communication circuit of the ECU 2100a and one of, for example, the processor that executes the control program stored in the memory and a digital circuit. Note that each of the ECUs 2100b to 2100d has substantially the same configuration as that of the ECU 2100a. The constituent element having a function that is the same as in the first embodiment is identified by the same reference numeral, and description of the constituent element is not repeated.

The determination rule holding unit 2107 holds a determination rule defining a correspondence between each of pairs consisting of an area type (described below) and a vehicle state and information as to whether an update process is performed. FIG. 16 illustrates an example of the determination rule in accordance with a vehicle state for each of the area types.

The frame processing unit 2105 is formed by partially modifying the frame processing unit 105 according to the first embodiment. The frame processing unit 2105 acquires, from the MAC key holding unit 111, a MAC key corresponding to the message ID for a pair consisting of the message ID and the value of the data field of each of all the data frames received by the frame interpretation unit 102. In addition, the frame processing unit 2105 acquires, from the counter holding unit 112, the counter value corresponding to the message ID and verifies the MAC value included in the data field. If, as a result of the verification, it is determined that an error has occurred (i.e., the verification has failed), the frame processing unit 2105 notifies the frame interpretation unit 102 of the error and stops the subsequent reception process. In addition, if the frame processing unit 2105 receives a frame indicating the vehicle state, the frame processing unit 2105 notifies the vehicle state holding unit 106 of the vehicle state in accordance with the frame. In addition, if the frame processing unit 2105 receives an update start frame, the frame processing unit 2105 sends the update start frame to the update determination unit 2109. Furthermore, the frame processing unit 2105 performs different processes for different ECUs in accordance with the data in the other received frames. For example, the ECU 2100a has a function of outputting alarm sound when the travel speed is higher than 30 km per hour and if the door is open. The ECU 2100c has a function of outputting alarm sound if no brake is applied and the door is open. The ECU 2100b and the ECU 2100d take no action. Note that the ECUs 2100a to 2100d may have a function other than the above-described functions. In addition, the frame processing unit 2105 examines the value of the ACK field of the data frame to determine whether the frame sent from the ECU 2100a has been normally received by the other ECUs. Thereafter, the frame processing unit 2105 sends the result of determination to the update processing unit 110.

The update determination unit 2109 acquires, from the area type holding unit 2116, the type of the bus 2200a to which the ECU 2100a is connected at the timing when the update determination unit 2109 receives, from the frame processing unit 2105, the information indicating that the frame processing unit 2105 has received the update start frame sent from the gateway 2400. Thereafter, the update determination unit 2109 receives the current vehicle state from the vehicle state holding unit 106 and determines whether the update process related to updating data used to generate MAC (i.e., the MAC key and the counter value) is to be performed in accordance with the determination rule acquired from the determination rule holding unit 107. More specifically, the update process includes the key update process for updating the MAC key, which is a key used to generate MAC, and the counter reset process for resetting the counter value that is reflected in MAC (i.e., updating the counter value to a particular value, such as zero). If the update determination unit 109 determines that the data used to generate MAC is updated, the update determination unit 109 notifies the update processing unit 110 of that information. However, if the update determination unit 109 determines that the data used to generate MAC is not updated, the update determination unit 109 waits for a change in the vehicle state.

The area type holding unit 2116 holds the area type indicating the type of the bus 2200a to which the ECU including the area type holding unit 2116 (the ECU 2100a) is connected. The area type is used to identify which one of a plurality of groups the bus and the ECU connected to the bus belong to. The groups are created based on, for example, the property of devices to which the ECU is connected. Examples of the group include a "drive-train" group and a "body family" group. In this example, for convenience of description, the in-vehicle network system 20 includes two buses (the bus 2200a and the bus 2200b). However, the in-vehicle network system may include more buses, and some of the plurality of buses may correspond to the same area type (i.e., belong to the same group). As a particular example of the area type of a bus, the bus connected to the ECU 2100a that is connected to the engine 310 and the ECU 2100a that is connected to the brake 320 corresponds to an area type referred to as "drive-train", and the bus connected to the ECU 2100c that is connected to the door open/close sensor 330 and the ECU 2100d that is connected to the window open/close sensor 340 corresponds to an area type referred to as "body family". According to the example, the area type holding unit 2116 of the ECU 2100a holds the area type "drive-train".

2.3 Example of Determination Rule

FIG. 16 illustrates an example of a determination rule held by each of the ECUs 2100a to 2100d. The determination rule determines the state of the vehicle having the in-vehicle network system 20 mounted therein (the vehicle state) as the condition that allows the update process to be performed. If, in an ECU connected to a bus of a certain area type, the vehicle state is a predetermined state defined by the determination rule (e.g., "parking") for the area type, the ECU is allowed to perform the update process. According to the determination rule illustrated in FIG. 16, for the ECU 2100a and the ECU 2100b connected to the bus of the type "drive train", when the vehicle state is "traveling" or "stopping", the update process is not performed even if an update timing at which the update process relate to, for example, updating the MAC key is to be performed is reached (that is, a timing at which the update start frame is received is reached), the ECU does not perform the update process and enters a wait mode. Thereafter, if the vehicle state changes to "parking", the update process is performed. In addition, when the vehicle state is "parking" and if an update timing is reached, the ECU performs the update process. In addition, for the ECU 2100c and the ECU 2100d connected to the bus of the type "body family", when the vehicle state is "traveling", the ECU does not perform the update process even if an update timing is reached and enters a wait mode. Thereafter, if the vehicle state changes to "stopping" or "parking", the update process is performed. In addition, when the vehicle state is "stopping" or "parking" and if an update timing is reached, the ECU performs the update process.

2.4 Configuration of Gateway

Figure 17:
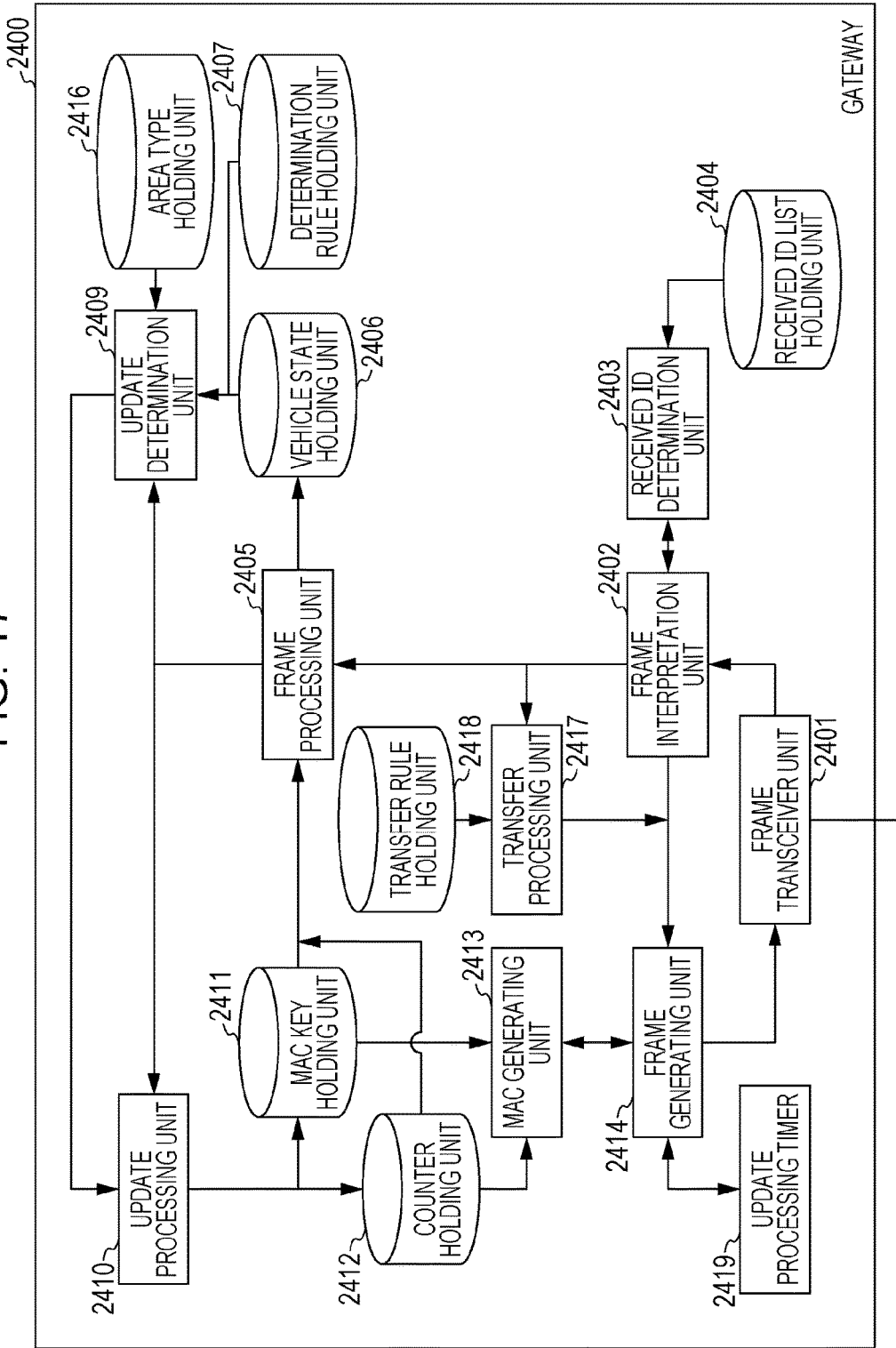
FIG. 17 is a configuration diagram of a gateway.

FIG. 17 is a configuration diagram of the gateway 2400. The gateway 2400 includes a frame transceiver unit 2401, a frame interpretation unit 2402, a received ID determination unit 2403, a received ID list holding unit 2404, a frame processing unit 2405, a vehicle state holding unit 2406, a determination rule holding unit 2407, an update determination unit 2409, an update processing unit 2410, a MAC key holding unit 2411, a counter holding unit 2412, a MAC generating unit 2413, a frame generating unit 2414, an area type holding unit 2416, a transfer processing unit 2417, a transfer rule holding unit 2418, and an update processing timer 2419. These constituent elements are functional constituent elements. The functions of the constituent elements are realized by the communication circuit of the gateway 2400 and one of, for example, the processor that executes the control program stored in the memory and a digital circuit.

The frame transceiver unit 2401 is similar to the frame transceiver unit 101 of the ECU 2100a. The frame transceiver unit 2401 sends and receives a frame to and from each of the buses 2200a and 2200b in accordance with the CAN protocol. The frame transceiver unit 2401 receives a frame from the bus and transfers the received frame to the frame interpretation unit 2402. In addition, the frame transceiver unit 2401 sends the information in the frame to the bus 2200a or 2200b on the basis of the bus information that indicates the destination bus and that is received from the frame generating unit 2414.

The frame interpretation unit 2402 receives the value of the frame from the frame transceiver unit 2401 and interprets the value so that the value is mapped to the fields of the frame format defined by the CAN protocol. The value that is determined to correspond to the ID field is transferred to the received ID determination unit 2403. In accordance with the result of determination sent from the received ID determination unit 2403, the frame interpretation unit 2402 determines whether the value of the ID field and the data field that follows the ID field are transferred to the transfer processing unit 2417 and the frame processing unit 2405 or reception of a frame is stopped. In addition, if determining that the frame does not follow the CAN protocol, the frame interpretation unit 2402 sends, to the frame generating unit 2414, a notification instructing the frame generating unit 2414 to send an error frame. Furthermore, upon receiving an error frame, the frame interpretation unit 2402 discards the subsequent part of the frame that is being received. That is, the frame interpretation unit 2402 stops interpreting the frame. Still furthermore, the frame interpretation unit 2402 sends, to the frame processing unit 2405, the ACK slot of the update start frame. The frame interpretation unit 2402 sends a data frame other than an update start frame to the transfer processing unit 2417.

The received ID determination unit 2403 receives the value of the ID field sent from the frame interpretation unit 2402 and determines whether to receive the fields subsequent to the ID field in accordance with a list of message IDs held by the received ID list holding unit 2404. The received ID determination unit 2403 sends the result of the determination to the frame interpretation unit 2402.

The received ID list holding unit 2404 is similar to the received ID list holding unit 104 of the ECU 2100a. The received ID list holding unit 2404 holds a received ID list, which is a list of message IDs received by the gateway 2400.

The frame processing unit 2405 is similar to the frame processing unit 105 of the ECU 2100a. The vehicle state holding unit 2406 is similar to the vehicle state holding unit 106 of the ECU 2100a. The determination rule holding unit 2407 is similar to the determination rule holding unit 107 of the ECU 2100a.

The update determination unit 2409 acquires, from the area type holding unit 2416, the types of the bus 2200a and the bus 2200b to which the gateway 2400 is connected at a timing at which the update determination unit 2409 receives the update start frame sent from the ECU including the update determination unit 2409 (the gateway 2400) from the frame processing unit 2405. Thereafter, the update determination unit 2409 acquires the current vehicle state from the vehicle state holding unit 106 and determines whether the update process (updating of the MAC key and resetting of the counter value) is to be performed in accordance with the determination rule acquired from the determination rule holding unit 107. If it is determined that the update process is to be performed, the update determination unit 2409 sends a notification indicating the result of the determination to the update processing unit 2410.

The update processing unit 2410 is similar to the update processing unit 110 of the ECU 2100a.

The MAC key holding unit 2411 is formed from a storage medium, such as a memory. The MAC key holding unit 2411 holds, for each of the buses and each of the message IDs, a MAC key required for the MAC generating unit 2413 and the frame processing unit 2405 to calculate MAC. In response to receipt of the notification from the update processing unit 2410, the MAC key holding unit 2411 discards the currently held key and holds the received key as the MAC key. According to the present embodiment, description is given under the assumption that the MAC key differs from bus to bus even when the message IDs are the same.

The counter holding unit 2412 is configured so as to include a storage medium, such as a memory. The counter holding unit 2412 holds, for each of the buses and each of the message IDs, a counter value required for the MAC generating unit 2413 and the frame processing unit 2405 to calculate MAC. Note that the counter value held by the counter holding unit 2412 is incremented (by one) if a frame is normally sent. As this method, when a data frame is sent, the counter value is used as a transmission counter, and the number of transmission events is counted. In addition, when a data frame is received, the counter value is used as a reception counter, and the number of reception events is counted. In addition, in response to a counter value sent from the update processing unit 2410, the counter holding unit 2412 holds the sent counter value. Furthermore, in response to a reset notification sent from the update processing unit 2410, the counter holding unit 2412 resets the held counter value. Through the reset operation, the counter value is undated to a particular value, such as zero. According to the present embodiment, description is given under the assumption that the counter value differs from bus to bus even when the message IDs are the same.

The MAC generating unit 2413 calculates MAC by applying the MAC key held by the MAC key holding unit 2411 to a value (a concatenated value) obtained by concatenating the message ID and the value of the data for the data field sent from the frame generating unit 2414 and the counter value held by the counter holding unit 2412 (i.e., the counter value corresponding to the bus to which the frame is to be sent and the message ID). That is, the MAC generating unit 2413 derives the value of MAC through calculation. Thereafter, the MAC generating unit 2413 sends the MAC (the result of calculation) to the frame generating unit 2414. In this example, HMAC (refer to RFC2104 HMAC: Keyed-Hashing for Message Authentication) is employed as the MAC calculation method. Calculation is performed on the value obtained by applying padding to the above-described concatenated value so that the concatenated value has a predetermined block length (e.g., 4 bytes) using the MAC key. The first 4 bytes of the resultant value of the calculation is used as a MAC value. Note that the size of the MAC value and the calculation method in this example are only for illustrative purposes, and the size of the MAC value and the calculation method are not limited thereto.

The frame generating unit 2414 configures an error frame in response to a notification that instructs transmission of the error frame and that is sent from the frame interpretation unit 2402 and sends the error frame to the frame transceiver unit 2401 to cause the frame transceiver unit 2401 to send the error frame. In addition, the frame generating unit 2414 sends, to the MAC generating unit 2413, the message ID and the value of data field sent from the transfer processing unit 2417. Thus, the frame generating unit 2414 receives MAC. The frame generating unit 2414 configures a frame on the basis of the message sent from the transfer processing unit 2417, the value of the data field, and the MAC sent from the MAC generating unit 2413 and sends the frame to the frame transceiver unit 2401. In addition, in response to a transmission instruction sent from the update processing timer 2419, the frame generating unit 2414 sends a particular message ID predetermined for an update start frame and the value of the data field to the MAC generating unit 2413 and receives MAC. Thereafter, the frame generating unit 2414 generates an update start frame including the particular message ID, the value of the data field, and the MAC and sends the generated update start frame to the frame transceiver unit 2401, which sends the update start frame. Upon sending the update start frame, the frame generating unit 2414 resets the timer value of the update processing timer 2419 (i.e., the value of the measured elapsed time) to zero.

The update processing timer 2419 is configured so as to include a clock mechanism that continuously counts up the timer value corresponding to the elapsed time. The update processing timer 2419 sequentially counts up the timer value from zero. If the timer value reaches a value indicating the elapsed time preset as a timing at which an update start frame is to be sent (e.g., 6 hours or 1 day), the update processing timer 2419 sends, to the frame generating unit 2414, an instruction to send the update start frame. In addition, in response to a notification from the frame generating unit 2414, the update processing timer 2419 resets the timer value to zero. Note that since the gateway 2400 is connected to a plurality of buses (the bus 2200a and the bus 2200b), the update processing timer 2419 may include a clock mechanism (a timer) for each of the buses, and the timings at which update start frames are sent to the buses may differ from each other. Alternatively, the timing at which an update start frame is sent may be determined on the basis of another method that does not use the clock mechanism. For example, a counter that is counted up each time a frame (a message) is sent may be provided. If, for example, the counter value reaches a predetermined threshold value, an update start frame may be sent and, in addition, the counter may be reset to zero.

The area type holding unit 2416 holds the types of the bus 2200a and the bus 2200b to which a unit including the area type holding unit 2416 (the gateway 2400) is connected. For example, the area type holding unit 2416 hold the area type "drive-train" for the bus 2200a and the area type "body family" for the bus 2200b.

The transfer processing unit 2417 selects a bus used for transfer in accordance with the transfer rule held by the transfer rule holding unit 2418 on the basis of the message ID of the received frame. Thereafter, the transfer processing unit 2417 sends, to the frame generating unit 2414, the bus information indicating the bus used for transfer and the message ID and the data sent from the frame interpretation unit 2402. The frame to be transferred is received from the transfer source bus by the gateway 2400. The MAC corresponding to the destination bus is attached to the frame by the gateway 2400 and is sent to the destination bus. Note that the gateway 2400 does not transfer, to other buses, an error frame received from some bus and an update start frame received from the bus to which the gateway 2400 has sent a frame.

Figures 18, 19:
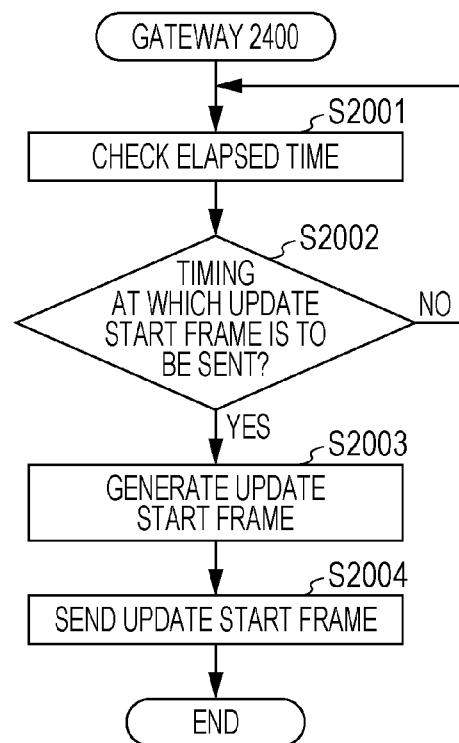
FIG. 18 illustrates an example of a transfer rule.
FIG. 19 is a flowchart of an example of an update start frame transmission process performed by the gateway.

The transfer rule holding unit 2418 holds the transfer rule which is the information indicating a rule regarding transfer of a frame for each of the buses. FIG. 18 illustrates an example of the transfer rule.

2.5 Example of Transfer Rule

FIG. 18 illustrates an example of the transfer rule held by the gateway 2400. The transfer rule has a correspondence among the transfer source bus, the transfer destination bus, and an ID (a message ID) of a frame to be transferred. In FIG. 18, the symbol "*" indicates that a frame is transferred regardless of the message ID. In an example illustrated in FIG. 18, setting is made so that a frame received from the bus 2200a is transferred to the bus 2200b regardless of the message ID. In addition, setting is made so that among frames received from the bus 2200b, only a frame having a message ID of "3" is transferred to the bus 2200a.

2.6 Update Process

Provision of MAC when a data frame is sent and an update process related to updating data required for generating MAC used to verify MAC when a data frame is received are described below. These processes are performed by each of the above-described ECUs. The ECUs connected to each of the buses need to synchronously perform provision of MAC and updating related to a MAC key and a counter value used for verification for each of the messages. Hereinafter, as an example, an update process related to MAC corresponding to a message ID among a plurality of ECUs connected to a bus is described with reference to an example in which the gateway 2400 performs an update start frame transmission process for sending an update start frame to the bus 2200a and, thereafter, the ECU 2100a sends an update frame for examining synchronization of updating to the bus 2200a under a predetermined condition, and the ECU 2100b receives the update frame from the bus 2200a.

FIG. 19 is a flowchart of an example of the update start frame transmission process performed by the gateway 2400.

The gateway 2400 checks the elapsed time since the previous transmission of an update start frame using the update processing timer 2419 (step S2001). Thereafter, the gateway 2400 determines whether the elapsed time has reached a predetermined period of time and, thus, the timing at which the update start frame is to be sent is reached (step S2002). If the timing at which the update start frame is to be sent is not reached, the gateway 2400 repeats checking the elapsed time until the elapsed time reaches the predetermined period of time. However, if the timing at which the update start frame is to be sent is reached, the gateway 2400 generates an update start frame (step S2003). That is, the gateway 2400 generates MAC using the predetermined message ID, the data value of the data field, the counter value, and the MAC key and generates an update start frame having the MAC attached thereto.

The gateway 2400 sends the update start frame generated in step S2003 to the bus 2200a (step S2004). The update start frame sent to the bus 2200a is received by the ECU 2100a and the ECU 2100b connected to the bus 2200a.

Figure 20:
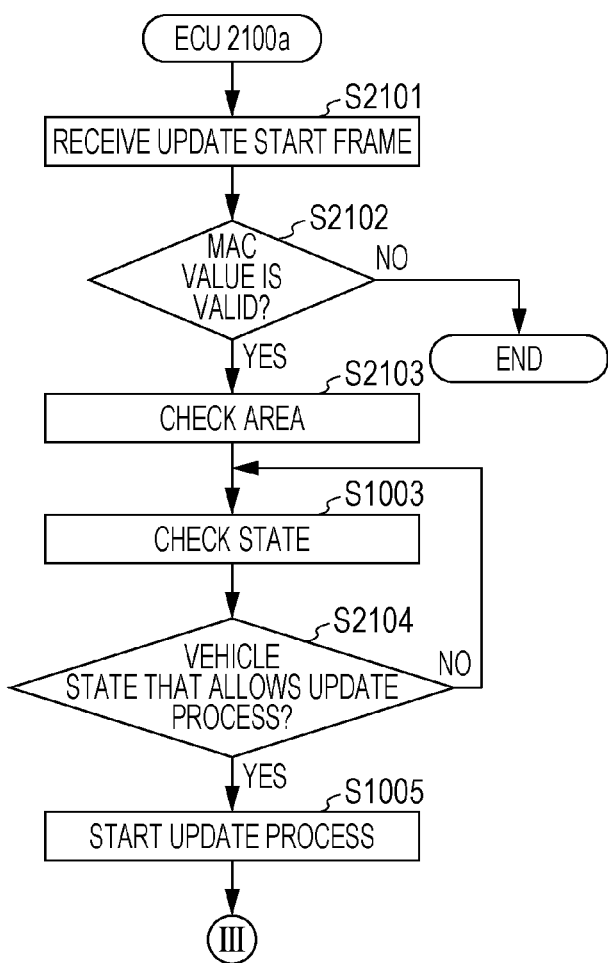
FIG. 20 is a flowchart illustrating an example of an update process performed by an ECU and a process related to determination of start of the update process (to be continued to FIG. 21)
Figure 21:
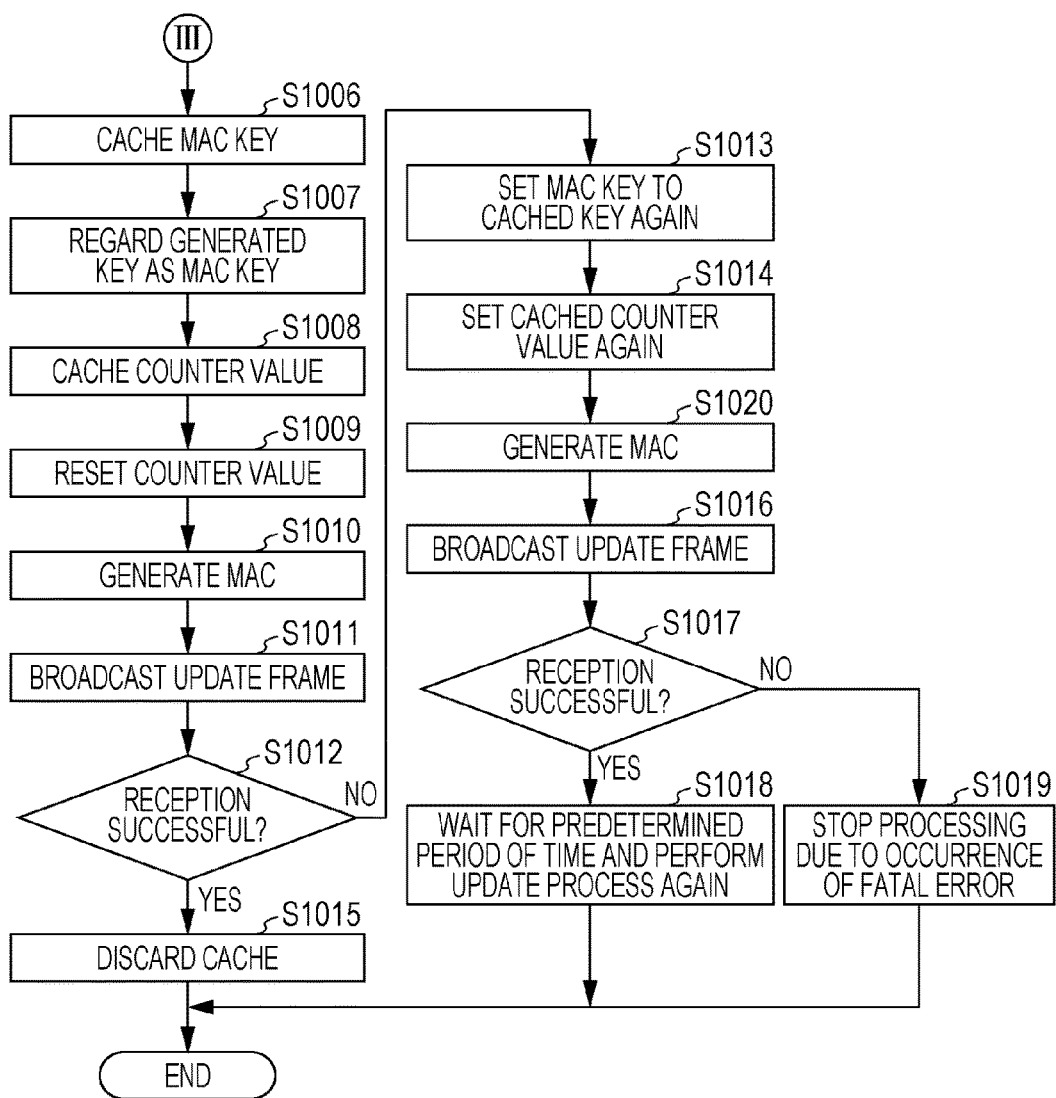
FIG. 21 is a flowchart illustrating the example of the update process performed by the ECU and the process related to determination of start of the update process (a continuation of FIG. 20)

FIGS. 20 and 21 are flowcharts illustrating an example of the update process performed by the ECU 2100a and a process related to determination of start of the update process. Note that among processing procedures (steps) illustrated in FIGS. 20 and 21, the step that is the same as that in FIG. 10 or 11 is identified with the same reference numeral, and description of the step is not repeated as needed. The operation performed by the ECU 2100a is described below with reference to FIGS. 20 and 21.

The ECU 2100a receives the update start frame sent from the gateway 2400 (step S2101). Thereafter, the ECU 2100a verifies the MAC in the update start frame (step S2102). If the verification of the MAC fails, the processing is completed.

However, if, in step S2102, the verification of the MAC is successful, the ECU 2100a checks the area type held by the area type holding unit 2116 (step S2103). Subsequently, the ECU 2100a checks the current vehicle state (step S1003) and determines whether the update process is to be performed in accordance with the determination rule that corresponds to the area type checked in step S2103 and that is held by the determination rule holding unit 2407 on the basis of the current vehicle state (step S2104). The vehicle state is continuously checked without performing the update process until the vehicle state changes to a state that is determined by the determination rule to perform the update process (step S1003). If the vehicle state is the state that is determined by the determination rule to perform the update process, the ECU 2100a starts the update process in step S1006 and the following steps illustrated in FIG. 21 (step S1005). According to the determination rule corresponding to "drive-train" illustrated in FIG. 16, when the vehicle state is "traveling" or "stopping", the update process is performed after the ECU 2100a waits until the vehicle state changes to "parking". However, when the vehicle state is "parking", the update process is immediately performed (step S1005).

The ECU 2100a that has started the update process performs the update process in the same manner as the ECU 100a according to the first embodiment (steps S1006 to S1020 in FIG. 21).

Figure 22:
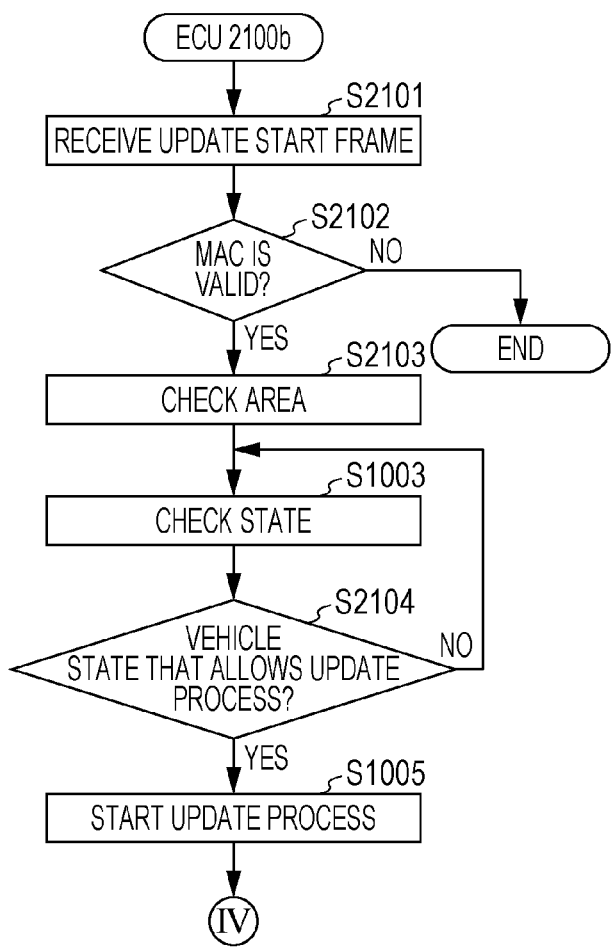
FIG. 22 is a flowchart illustrating an example of an update process performed by an ECU and a process related to determination of start of the update process (to be continued to FIG. 23)
Figure 23:
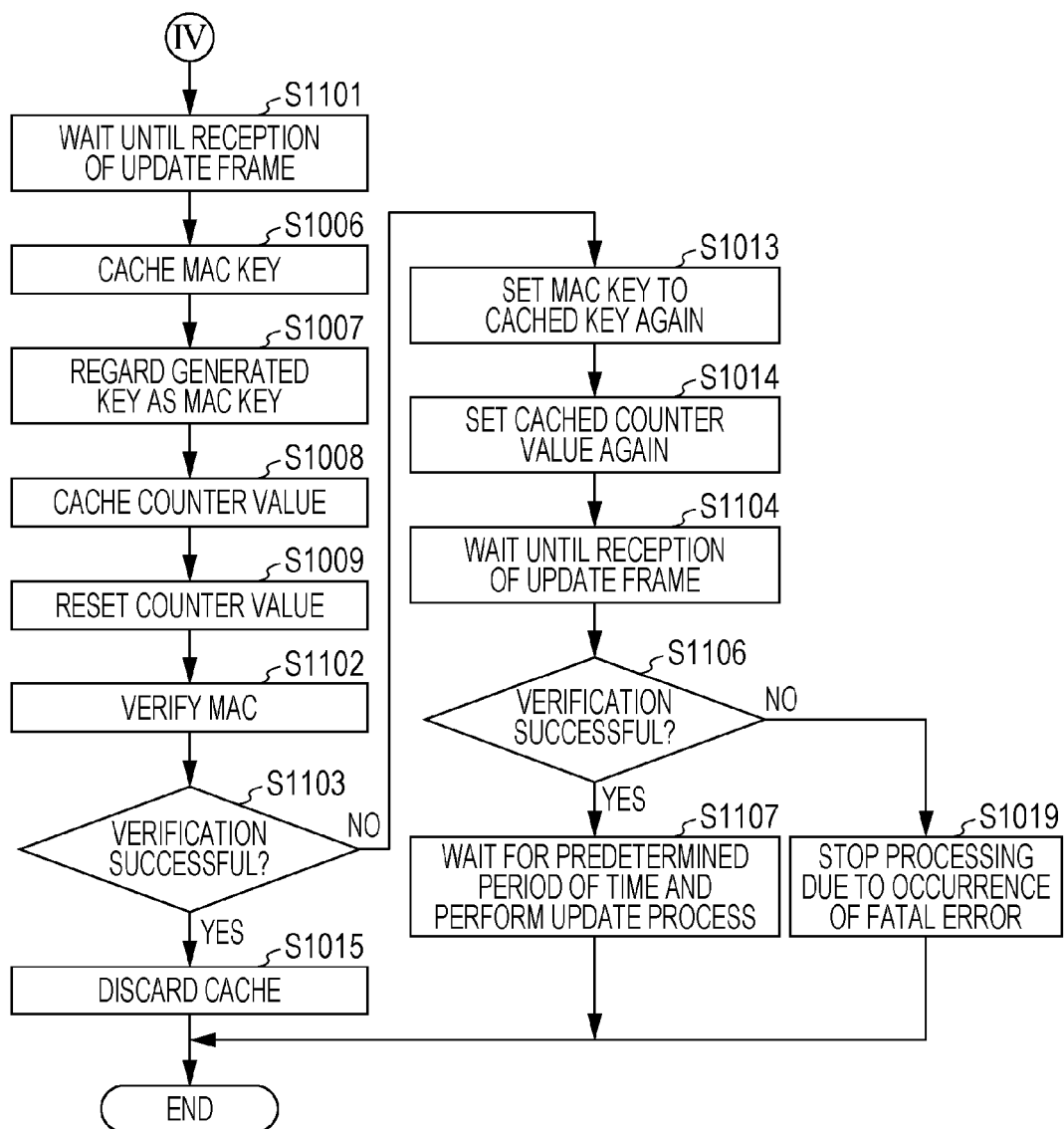
FIG. 23 is a flowchart illustrating the example of the update process performed by the ECU and the process related to determination of start of the update process (a continuation of FIG. 22).

FIGS. 22 and 23 are flowcharts of an example of the update process performed by the ECU 2100b and a process related to determination of start of the update process. Note that among processing procedures (steps) illustrated in FIGS. 22 and 23, the step that is the same as that in FIG. 12, 13, or 20 is identified with the same reference numeral, and description of the step is not repeated as needed. The operation performed by the ECU 2100b is described below with reference to FIGS. 22 and 23.

The ECU 2100b receives the update start frame sent from the gateway 2400 (step S2101). Thereafter, the ECU 2100b verifies the MAC in the update start frame (step S2102). If the verification of the MAC fails, the processing is completed.

However, if, in step S2102, the verification of the MAC is successful, the ECU 2100b checks the area type held by the area type holding unit 2116 (step S2103). Subsequently, the ECU 2100b checks the current vehicle state (step S1003) and determines whether the update process is to be performed in accordance with the determination rule that corresponds to the area type checked in step S2103 and that is held by the determination rule holding unit 2407 on the basis of the current vehicle state (step S2104). The vehicle state is continuously checked without performing the update process until the vehicle state changes to a state that is determined by the determination rule to perform the update process (step S1003). If the vehicle state is the state that is determined by the determination rule to perform the update process, the ECU 2100b starts the update process in the step S2101 and the following steps illustrated in FIG. 23 (step S1005). According to the determination rule corresponding to "drive-train" illustrated in FIG. 16, when the vehicle state is "traveling" or "stopping", the update process is performed after the ECU 2100b waits until the vehicle state changes to "parking". However, when the vehicle state is "parking", the update process is immediately performed (step S1005).

The ECU 2100b that has started the update process performs the update process in the same manner as the ECU 100b according to the first embodiment (steps S2101 to S1019 in FIG. 23).

In addition, the gateway 2400 performs the above-described update process illustrated in FIGS. 22 and 23 and the process related to determination of start of the update process in the same manner as ECU 2100b.

Note that the gateway 2400 can similarly send an update start frame to the bus 2200b through the update start frame transmission process (refer to FIG. 19). In response to the operation, the ECU 2100c and the ECU 2100d can perform the update process through the processing procedure illustrated in FIGS. 20 to 23.

2.7 Effect of Second Embodiment

The ECU according to the second embodiment performs the update process related to updating data used to generate MAC (e.g., updating of the MAC key and resetting of the counter value) in accordance with the area type of the bus to which the ECU is connected and the state of the vehicle. Since such an update process is performed as needed, the security against a brute force attack on MAC from a fraudulent node connected to the bus can be increased. Note that for each of the buses identified by the area type, such as "drive-train" or "body family", a relationship between the amount of processing performed by the ECU and the vehicle state may vary. Accordingly, by determining the determination rule for each of the area types and for each of the vehicle states, a plurality of ECUs can efficiently and synchronously perform the update process. For example, updating of the MAC keys of a plurality of ECUs connected to a drive-train bus is performed during parking in which the processing load is low. In this manner, updating of the MAC key used to generate MAC and resetting of the counter value can be performed for each of ECU groups having a high correlation (for each of the area types of bus to which the ECUs are connected) at different points in time and at appropriate timings. In addition, the update process can be performed in accordance with the state of the vehicle so that the update process is avoided if the amount of traffic of the bus is relatively high due to frames sent from the ECUs (e.g., during travelling of the vehicle).

Other Embodiments

While the first and second embodiments have been described as examples of the technology according to the present disclosure, the technology of the present disclosure is not limited thereto. The technology of the present disclosure is applicable to other embodiments obtained by making any changes, replacement, addition, and removal in the first and second embodiments as needed. For example, the following modifications are encompassed within an aspect of the present disclosure.

(1) While the above embodiments have been described with reference to the ECUs 100a to 100d or the ECUs 2100a to 2100d that periodically send a frame, the frame may be sent in the form of an event that indicates a change in the state. For example, instead of periodically sending the door open/close state, the ECU may send a frame only when the door open/close state changes. Alternatively, the ECU may periodically send a frame and, in addition, the ECU may send a frame when a state change occurs.

(2) While the above embodiments have been described with reference to calculating MAC from the data value and the counter value, MAC may be calculated from only the data value. Alternatively, MAC may be calculated from only the counter value. Still alternatively, MAC may be calculated from the value in one of the other fields included in the data frame. In addition, the size of MAC included in a frame is not limited to 4 bytes. The size of MAC may be changed in each transmission. Similarly, the size of the counter value is not limited to 1 byte. In addition, a frame need not include the counter value at all times. Alternatively, all or part of the counter value may be included in a frame to be sent. In addition, the MAC size is not limited to a fixed size. The MAC size may vary from message ID to message ID. In addition, MAC may be sent using a plurality of frames.

(3) While the above embodiments have been described with reference to the counter value incremented in each transmission as the configuration that counts the number of data frame transmission events (or the number of data frame reception events), calculation performed on the counter value is not limited to increment (by one). The counter value may be incremented by two. Alternatively, the calculation is not limited to counting up by increment. The calculation may be counting down by decrement. Still alternatively, the calculation performed on the counter value may be bit shift or calculation for obtaining, as a result of calculation, an output value identified on the basis of a predetermined algorithm using the result of the previous calculation as the input value. Note that in the update process, the counter value is set to a particular value, such as zero, by resetting.

(4) While the above embodiments have been described with reference to the data frame that is based on the CAN protocol and that is written in the standard ID format, the data frame may be written in the extended ID format. In the case of the extended ID format, the ID (the message ID) has 29 bits made up of a base ID located at the ID position in the standard ID format and an extended ID. Accordingly, this 29-bit ID can be regarded as the ID (the message ID) used in the processes according to the above-described embodiments.

(5) While the above embodiments have been described with reference to HMAC serving as the algorithm used to calculate MAC, CBC-MAC (Cipher Block Chaining Message Authentication Code) or CMAC (Cipher-based MAC) may be employed. In addition, any padding method that requires the data size of a block for calculation, such as zero padding, ISO10126, PKCS#1, PKCS#5, or PKCS#7, may be employed as the padding method used to calculate MAC. In addition, to change the size to, for example, a 4-byte block, padding may be applied to any one of the topmost portion, the rearmost portion, and the middle portion. In addition, the data used to calculate MAC need not be continuous data (e.g., 4-byte continuous data). The data may be obtained by concatenating 1-bit data collected in accordance with a predetermined rule.

(6) While the above embodiments have been described with reference to an example of the update process that updates the MAC key and resets the counter value, only one of the updating and resetting may be performed. That is, the term "update process" may refer to a key update process that updates the value of the MAC key, which is a key used to generate MAC. Alternatively, the term "update process" may refer to the counter reset process that resets the counter value that is reflected in MAC (i.e., a process that updates the counter value to a particular value, such as zero). In addition, to update the MAC key and generate a new MAC key, calculation using a dedicated key may be employed. As described above, to update the MAC key, the current MAC key (the unupdated MAC key) is input to a predetermined one-way function, and the derived result is defined as a new MAC key (an updated MAC key). However, a method other than such a method may be employed. That is, a plurality of ECUs that synchronously update the MAC key can generate a MAC key having a value that differs from the value of the unupdated MAC key using, for example, the same algorithm.

(7) While the above embodiments have been described with reference to "traveling", "stopping", and "parking" as an example of the vehicle states, other state may be employed. For example, "fueling" indicating the state detected on the basis of open/close of the filler cap may be employed as one of the vehicle states. In addition, if the vehicle is an electric vehicle, the state "charging" detected on the basis of connection of a charging plug may be employed as one of the vehicle states. In addition, instead of employing the state "traveling", the different states "low-speed traveling" and "high-speed traveling" may be employed as the vehicle state. Note that the vehicle state can be determined in the following manner. That is, any one of the ECUs in a vehicle sends a data frame including, for example, a sensor value acquired from one of devices, and the other ECUs receive the data frame.

(8) While the above embodiments have been described with reference to a MAC key held for each of the message IDs, a MAC key may be held for each of the ECUs (i.e., for each of one or more message ID groups). In addition, all the ECUs need not have the same MAC key. In addition, the ECUs connected to the same bus may have a common MAC key. Note that an ECU that sends a frame having the same message ID in a bus and an ECU that receives and verifies the frame need to hold the same MAC key. In addition, while the above embodiments have been described with reference to a counter value held for each of the message IDs, the counter value may be held for each of the ECUs (i.e., for each of one or more message ID groups). Alternatively, a common counter value may be employed for all the frames flowing in the same bus.

(9) While the above embodiments have been described with reference to a technique in which the MAC key and the counter value differ from bus to bus even for the same message ID, the same MAC key may be employed for different buses. In addition, even for different buses, the same counter value may be employed. Note that the ECUs that employ the same MAC key or the same counter value need to synchronously update the MAC key or synchronously reset the counter value. For example, the gateway 2400 may send the update start frame to all the buses at the same time.

(10) While the above embodiments have been described with reference to an example in which the ACK slot is used for the sender to determine whether an update frame has been received, an ECU that has received the update frame may send a data frame indicating successful reception instead of setting the ACK slot to dominant indicating normal reception. In particular, to synchronously perform updating of the MAC key or resetting of the counter value among a plurality of ECUs connected to different buses, it is effective that a data frame indicating successful reception is sent for the update frame. Note that in such a case, the gateway transfers an update frame and a data frame indicating successful reception between the buses.

(11) The determination rule described in the above embodiments is only an example. The values may be changed to different values. Alternatively, a plurality of determination rules may be employed. The determination rule may have an additional condition (e.g., a condition that a predetermined period of time has elapsed since the previous update process) if the condition for performing the update process is a predetermined vehicle state (e.g., a parking state). In addition, the determination rule may be set when the ECUs and the gateway are shipped or the vehicle body having the in-vehicle network system mounted therein is shipped. Alternatively, the determination rule may be set on the basis of communication with the outside or using one of a variety of recording media or one of some tools.

(12) Instead of sending the update start frame described in the above embodiments by the gateway 2400, any one of the ECUs 2100a to 2100d may send the update start frame. Alternatively, the in-vehicle network system may include an ECU dedicated to send an update start frame, and the ECU may send an update start frame. In addition, for each of the message IDs that are targets of the update process, the update start frame may include identification information regarding the message ID and may be sent. In this case, an ECU that has received the update start frame can perform the update process corresponding to the message ID (updating of the MAC key corresponding to the message ID and resetting of the counter value corresponding to the message ID). Alternatively, if an update start frame is sent once, all the ECUs that has received the update start frame may update all the held MAC keys and reset all the held counter values.

(13) While the above embodiments have been described with reference to a technique in which the elapsed time is sequentially checked in checking the elapsed time based on the timer 108 by the ECU (steps S1001 and S1002) and in checking the elapsed time based on the update processing timer 2419 by the gateway (steps S2001 and S2002), a technique in which for example, the timers send the information indicating the elapse of a predetermined period of time may be employed. In addition, while the above embodiments have been described with reference to the update timing determined as a timing at which a predetermined period of time has elapsed in the timer 108, the update timing may be a timing at which a quantity of a given type measured by any counter since the previous update timing or the previous update process reaches a predetermined quantity. For example, the update timing may be a timing at which a counter value serving as the transmission counter or the reception counter exceeds a threshold value that is smaller than the predetermined highest value. In addition, while the above embodiments have been described with reference to the update start frame transmission timing determined as a timing at which the timer value of the update processing timer 2419 reaches a value indicating the predetermined elapsed time, the update start frame transmission timing may be a timing at which a quantity of a given type measured by any counter since the previous update start frame transmission timing (i.e., the timing at which the update process has previously been performed) reaches a predetermined quantity.

(14) The area types described in the above embodiments are only an example of groups. In addition to "drive-train" and "body family", the area types may include, but not limited to, "power-train", "driving safety control system", "external communication system", and "AV processing system" in accordance with the properties of the ECUs connected to the bus or the properties of devices connected to the ECUs. In addition, a bus or an ECU may belong to a plurality of groups. Accordingly, the ECU may hold a plurality of area types. Alternatively, in the determination rule, the vehicle state, which is a condition for performing the update process, may be determined so that an area type and a bus have a one-to-one correspondence (i.e., the buses are individually identified).

(15) The functional partition among the functional constituent elements of the devices, such as the ECU, according to the above-described embodiments is only an example. The functional partition can be changed. For example, the functional partition among the update processing unit, the update determination unit, and the functional constituent elements related to the update processing unit and the update determination unit is only an example. Accordingly, these constituent elements may be integrated into and configured as an update processing unit that performs the update process (e.g., updating of the MAC key held by the MAC key holding unit) under the condition that the vehicle state is a predetermined state.

(16) While the above embodiments have been described with reference to an ECU that verifies MAC upon receiving a data frame communicated among the ECUs, the in-vehicle network system may include an ECU dedicated to MAC verification that verifies the MACs provided to all the data frames. The ECU dedicated to MAC verification holds the MAC keys and the counter values corresponding to all the message IDs. If the ECU dedicated to MAC verification determines that an error has occurred as a result of verification (i.e., the verification failed), the ECU dedicated to MAC verification may send an error frame in order to prevent the other ECUs from receiving the data frame.

(17) While the above embodiments have been described with reference to each of the ECUs that sends a data frame, the in-vehicle network system may include an ECU that only receives a data frame without sending a data frame. Conversely, the in-vehicle network system may include an ECU that only sends a data frame without receiving any data frame.

(18) The CAN protocol according to the above-described embodiments may be a CAN protocol that adopts a broad definition including a derivative protocol, such as TTCAN (Time-Triggered CAN) or CANFD (CAN with Flexible Data Rate).

(19) The MAC key holding unit and the counter holding unit according to the above-described embodiments may be stored in a register of the hardware called a CAN controller or the firmware running in a microcomputer that is connected to a CAN controller.

(20) While the above embodiments have been described with reference to the ECUs each being a unit including, for example, a digital circuit (e.g., a processor and a memory), an analog circuit, and a communication circuit, the ECU may include other hardware constituent elements, such as a hard disk unit, a display, a keyboard, and a mouse. Alternatively, the function may be realized by dedicated hardware (e.g., a digital circuit) instead of being realized by software, that is, a control program stored in a memory and executed by a processor.

(21) Some or all of the constituent elements that constitute each of the units of the above-described embodiments (e.g., the ECU) may be formed from a single system LSI (Large Scale Integration). A system LSI is a super multifunctional LSI produced by integrating a plurality of constituent units into one chip. More specifically, the system LSI is a computer system including a microprocessor, a ROM, and a RAM. The RAM has a computer program stored therein. The microprocessor operates in accordance with the computer program and, thus, the system LSI realizes the function. Alternatively, the units of the constituent element that constitutes each of the above-described devices may be individually formed as one chip, or the one chip may be formed so as to include some or all of the units. Note that although the term "system LSI" is used, the system LSI may be referred to as an "IC", an "LSI", a "super LSI", or an "ultra LSI" depending on the integration degree. The method for integrating the units is not limited to making an LSI. The method for integrating the units may be realized by a dedicated circuit or a general-purpose processor. Alternatively, an FPGA (Field Programmable Gate Array) that is programmable after the LSI is produced or a reconfigurable processor that allows the circuit cells in the LSI to be re-connected and allows the settings to be reconfigured may be employed. Still alternatively, if a new technology that replaces an LSI is developed with the advancement of semiconductor technology or another related technology, the functional blocks may be integrated by using such a technology. Note that there is a possibility of applying biotechnology.

(22) Some or all of the constituent elements that constitute each of the above-described units may be formed from an IC card or a single module removable from the device. The IC card or the module is a computer system formed from, for example, a microprocessor, a ROM, and a RAM. The IC card or the module may include the above-described super multifunctional LSI. When the microprocessor operates in accordance with the computer program, the IC card or the module provides its function. The IC card or the module may be tamper resistant.

(23) According to an aspect of the present disclosure, the above-described fraud detection method may be provided. The method may be represented by a computer program realized by a computer or a digital signal formed from the computer program. According to another aspect of the present disclosure, the computer program or the digital signal recorded in a computer-readable storage medium, such as a flexible disk, a hard disk, a CD-ROM, an MO, a DVD, a DVD-ROM, a DVD-RAM, a BD (Blu-ray (trade name) Disc), or a semiconductor memory, may be provided. In addition, the above-described digital signal recorded in such a storage medium may be provided. According to another aspect of the present disclosure, the computer program or the digital signal may be transmitted via an electric communication network, a wireless or wired communication network, a network represented by the Internet, or data broadcasting. According to another aspect of the present disclosure, a computer system including a microprocessor and a memory is provided. The memory may store the computer program therein, and the microprocessor may operate in accordance with the computer program. Furthermore, the present disclosure may be realized by another independent computer system by recording the program or the digital signal in the storage medium and transferring the storage medium or transferring the program or the digital signal via, for example, the above-mentioned network.

(24) The aspect realized by combining the constituent elements described in the above-described embodiments and the modifications in any way is encompassed within the scope of the present disclosure.

The present disclosure is available in order to increase the security against an attack from a fraudulent ECU in an in-vehicle network system.

What is claimed is:

1. A method for use in an in-vehicle network system including a first electronic control unit and a second control unit, each of the first electronic control unit and the second electronic control unit communicating a data frame having a message authentication code (MAC) added thereto with one another via at least one bus in accordance with Controller Area Network (CAN) protocol, the method comprising:

the first electronic control unit detecting a state of a vehicle having the in-vehicle network system mounted therein;

the first electronic control unit sending a data frame identified with a predetermined message ID;

the first electronic control unit generating a first message authentication code that reflects the value of a transmission counter which counts the number of transmission events using a first MAC key;

the first electronic control unit adding the first message authentication code to the data frame to be sent;

the first electronic control unit updating the first MAC key used to generate the first message authentication code under the condition that the detected state of the vehicle is a predetermined state;

the second electronic control unit detecting a state of the vehicle having the in-vehicle network system mounted therein;

the second electronic control unit receiving the data frame identified with a predetermined message ID;

the second electronic control unit generating a second message authentication code that reflects the value of a reception counter which counts the number of reception events using a second MAC key;

the second electronic control unit verifying whether the message authentication code added to the received data frame is the same as the second message authentication code;

the second electronic control unit updating the second MAC key used to generate the second message authentication code under the condition that the detected state of the vehicle is the predetermined state; and resetting the transmission counter and the reception counter under the condition that the detected state of the vehicle is the predetermined state.

2. The method according to claim 1, wherein the at least one bus comprises a plurality of buses,
wherein each of the first and second electronic control units is connected to one of the buses,
wherein in the updating the first MAC key and second MAC key, the MAC key respectively held by each of the first and second electronic control units is updated, and the predetermined state is determined depending on the bus to which the each of the first electronic control unit and second electronic control unit is connected.

3. The method according to claim 1, wherein the at least one bus comprises a plurality of buses,
wherein each of the plurality of buses belongs to any one of a plurality of types of group, and the first and second electronic control units are connected to any one of the buses, and
wherein in the updating the first MAC key and second MAC key, the MAC key respectively held by each of the first electronic control unit and second electronic control unit is updated, and the predetermined state is determined depending on the group to which the bus to which the each of the first and second electronic control unit is connected belongs.

4. The method according to claim 1, wherein in the first MAC key and second MAC key are updated if the detected state of the vehicle is the predetermined state at a timing at which a quantity of a given type counted since previous updating of the first MAC key and second MAC key reaches a predetermined quantity.

5. The method according to claim 4, wherein in the updating the first MAC key and second MAC key, if the detected state of the vehicle is not the predetermined state at a timing at which a quantity of a given type counted since previous updating of the first MAC key and second MAC key reaches a predetermined quantity, the first MAC key and second MAC key are updated at a timing at which the detected state of the vehicle changes to the predetermined state.

6. The method according to claim 1, wherein the predetermined state is a state in which the vehicle is not traveling.

7. The method according to claim 6, wherein the state in which the vehicle is not traveling is a state in which the vehicle is parking.

8. An in-vehicle network system including a plurality of electronic control units that each communicate a data frame having a message authentication code (MAC) added thereto with one another via at least one bus in accordance with Controller Area Network (CAN) protocol, the system comprising:
   a first electronic control unit including one or more memories and circuitry which, in operation, holds a first MAC key used to generate the message authentication code, generates a first message authentication code that reflects the value of a transmission counter which counts the number of transmission events using the first MAC key, adds the generated first message authentication code to a data frame identified by a predetermined message ID, sends the data frame, and updates the first MAC key under the condition that a state of a vehicle having the in-vehicle network system mounted therein is a predetermined state; and
   a second electronic control unit including one or more memories and circuitry which, in operation, holds a second MAC key used to generate the message authentication code, generates a second message authentication code that reflects the value of a reception counter which counts the number of reception events using the second MAC key, receives a data frame identified by the predetermined message ID, verifies whether the message authentication code added to the received data frame is the same as the second message authentication code, and updates the second MAC key under the condition that the state of the vehicle is a predetermined state, wherein the transmission counter and the reception counter are reset under the condition that the state of the vehicle is the predetermined state.

9. The in-vehicle network system according to claim 8, wherein when updating the first MAC key, the circuitry of the first electronic control unit determines whether the state of the vehicle is a predetermined state when receiving a particular frame identified by a predetermined particular message ID and updates the first MAC key if the state of the vehicle is the predetermined state, and wherein when updating the second MAC key, the circuitry of the second electronic control unit determines whether the state of the vehicle is a predetermined state when receiving a particular frame identified by a predetermined particular message ID and updates the second MAC key if the state of the vehicle is the predetermined state.

10. A plurality of electronic control units for operating in accordance with Controller Area Network (CAN) protocol, comprising a first electronic control unit and a second electronic control unit, each comprising one or more memories and circuitry which, in operation:
   holds, via the first electronic control unit, a first MAC key used to generate a first message authentication code (MAC);
   detects, via the first electronic control unit, a state of a vehicle;
   sends, via the first electronic control unit, a data frame identified with a predetermined message ID;
   adds, via the first electronic control unit, the first message authentication code to the data frame to be sent;
   generates, via the first electronic control unit, the first message authentication code that reflects the value of a transmission counter which counts the number of transmission events using the first held MAC key;
   updates, via the first electronic control unit, the first held MAC key under the condition that a state of a vehicle having the electronic control unit mounted therein is a predetermined state;
   holds, via the second electronic control unit, a second MAC key used to generate a second message authentication code (MAC);
   detects, via second electronic control unit, a state of a vehicle;
   receives, via the second electronic control unit, the data frame identified with a predetermined message ID;
   generates, via the second electronic control unit, the second message authentication code that reflects the value of a reception counter which counts the number of reception events using the second held MAC key;
   verifies, via the second electronic control unit, whether the message authentication code added to the received data frame is the same as the second message authentication code;
   updates, via the second electronic control unit, the second MAC key used to generate the second message authentication code under the condition that the detected state of the vehicle is the predetermined state; and
   resets the transmission counter and the reception counter under the condition that the detected state of the vehicle is the predetermined state.

* * * * *